US012777535B2

(12) United States Patent
Kitagawa et al.

(10) Patent No.: US 12,777,535 B2
(45) Date of Patent: Oct. 27, 2026

(54) HANDLING DIFFERENT MANAGEMENT SCHEMES FOR COMMUNICATION CONTROL MODEL

(71) Applicant: RAKUTEN MOBILE, INC., Tokyo (JP)

(72) Inventors: Koichiro Kitagawa, Tokyo (JP); Awn Muhammad, Tokyo (JP); Subramanya Chandrashekar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 390 days.

(21) Appl. No.: 18/570,068

(22) PCT Filed: Aug. 1, 2023

(86) PCT No.: PCT/JP2023/028113

§ 371 (c)(1),
(2) Date: Dec. 14, 2023

(87) PCT Pub. No.: WO2024/171485

PCT Pub. Date: Aug. 22, 2024

(65) Prior Publication Data

US 2025/0106911 A1 Mar. 27, 2025

(30) Foreign Application Priority Data

Feb. 16, 2023 (JP) ................................. 2023-022402
Apr. 6, 2023 (JP) ................................. 2023-062135

(51) Int. Cl.
*H04W 76/11* (2018.01)
*H04W 8/26* (2009.01)
*H04W 48/16* (2009.01)

(52) U.S. Cl.
CPC ............. *H04W 76/11* (2018.02); *H04W 8/26* (2013.01); *H04W 48/16* (2013.01)

(58) Field of Classification Search
CPC ....... H04W 8/26; H04W 24/02; H04W 24/10; H04W 48/16; H04W 48/18; H04W 76/11
See application file for complete search history.

(56) References Cited

U.S. PATENT DOCUMENTS

| | | | | |
|---|---|---|---|---|
| 11,399,281 | B2 * | 7/2022 | Tsiatsis | H04L 67/141 |
| 11,917,527 | B2 * | 2/2024 | Chou | H04W 48/18 |

(Continued)

FOREIGN PATENT DOCUMENTS

| | | | |
|---|---|---|---|
| EP | 2343923 | A1 | 7/2011 |
| WO | 2022071761 | A1 | 4/2022 |

OTHER PUBLICATIONS

Fujitsu, "Discussion on General Aspects of AI/ML Framework", 3GPP TSG RAN WG1 #111, R1-2211072, France, Nov. 7, 2022, 1-8 pages, 9pp.

(Continued)

*Primary Examiner* — Eric Nowlin
(74) *Attorney, Agent, or Firm* — HAUPTMAN HAM, LLP

(57) ABSTRACT

A communication control apparatus includes at least one processor that performs: in case a communication control model concerning communication control between a communication device and a network that provides communication service to the communication device can be managed by the communication device and the network under different management schemes, causing an ID associator to associate a communication-device-side ID of the communication control model managed by the communication device and a network-side ID of the communication control model managed by the network; and causing an identifying information provider to provide identifying information from at least one of the communication device and the network to the other of the communication device and the network to identify the (Continued)

correct communication control model in accordance with the association between the communication-device-side ID and the network-side ID.

10 Claims, 12 Drawing Sheets

(56) References Cited

U.S. PATENT DOCUMENTS

| | | | | |
|---|---|---|---|---|
| 12,052,583 | B2 * | 7/2024 | Chakraborty | H04W 16/22 |
| 12,126,656 | B2 * | 10/2024 | Wang | H04L 67/10 |
| 12,205,147 | B2 * | 1/2025 | Zhang | G06F 18/214 |
| 12,244,468 | B2 * | 3/2025 | Kumar | H04W 76/27 |
| 12,470,919 | B2 * | 11/2025 | Tsiatsis | H04W 12/041 |
| 12,501,417 | B2 * | 12/2025 | Guchhait | H04B 7/0695 |
| 2016/0360462 | A1 | 12/2016 | Chockalingam et al. | |
| 2019/0340534 | A1 * | 11/2019 | McMahan | G06F 17/16 |
| 2021/0136638 | A1 | 5/2021 | Paladugu et al. | |
| 2021/0168643 | A1 | 6/2021 | Yao et al. | |
| 2021/0243600 | A1 * | 8/2021 | Yu | H04W 12/75 |
| 2021/0345201 | A1 | 11/2021 | Cheng et al. | |
| 2021/0368399 | A1 | 11/2021 | Zou et al. | |
| 2021/0392495 | A1 * | 12/2021 | Tsiatsis | H04W 12/0433 |
| 2022/0020064 | A1 * | 1/2022 | Zhang | G06Q 30/0269 |
| 2022/0225188 | A1 | 7/2022 | Pezeshki et al. | |
| 2022/0256409 | A1 * | 8/2022 | Hanada | H04W 12/08 |
| 2022/0360982 | A1 * | 11/2022 | Tsiatsis | H04W 12/40 |
| 2023/0062443 | A1 * | 3/2023 | Chakraborty | H04W 24/04 |
| 2023/0093963 | A1 * | 3/2023 | Kumar | H04L 41/16 370/252 |
| 2023/0128064 | A1 * | 4/2023 | Wang | H04L 63/0236 726/1 |
| 2023/0232434 | A1 * | 7/2023 | Lee | H04W 72/51 455/450 |
| 2023/0275812 | A1 * | 8/2023 | Filoche | G06N 3/047 706/12 |
| 2024/0039799 | A1 * | 2/2024 | Parichehrehteroujeni | H04L 1/0009 |
| 2024/0107429 | A1 * | 3/2024 | Challita | G06N 3/045 |
| 2024/0334201 | A1 * | 10/2024 | Bala | G06N 3/0455 |
| 2025/0324349 | A1 * | 10/2025 | Lee | G06N 3/08 |
| 2025/0379798 | A1 * | 12/2025 | Sheng | G06N 20/00 |
| 2025/0392523 | A1 * | 12/2025 | Estevez | H04L 41/0853 |
| 2026/0019344 | A1 * | 1/2026 | Niu | H04B 7/0626 |
| 2026/0032466 | A1 * | 1/2026 | Zhang | G06F 8/65 |

OTHER PUBLICATIONS

Huawei, Hisilicon, "Discussion on general aspects of AI/ML Framework", 3GPP TSG RAN WG1 #111, R1-2210884, France, Nov. 7, 2022, 22pp.

Office Action in U.S. Appl. No. 18/684,837, mailed Feb. 2, 2026, 35pp.

* cited by examiner

FIG. 3

| Model ID (UE) | Functionality ID (NW) | Model Set (NW) |
|---|---|---|
| 0 | 10 | A |
| 1 | 20 | B |
| 2 | 30 | C |
| 3 | 40 | D |
| 4 | 50 | E |
| UE operating under model based management scheme | NW operating under functionality based management scheme | NW operating under model based management scheme |

FIG. 4

| Model ID & Functionality ID (UE/NW Common) | Model Set (UE) | Functionality Set (NW) |
|---|---|---|
| 10 | A | a |
| 21 | B | b |
| 32 | C | c |
| 43 | D | d |
| 54 | E | e |
| | UE operating under model based management scheme | NW operating under functionality based management scheme |

FIG. 5

Functionality ID *a*

{

Applied use case set,

Applied LCM functionality set,

Applied model ID set

}

FIG. 6

Model ID *a*

{ model parameters, model structure, functionality ID

}

FIG. 8

| TERMINOLOGY | DESCRIPTION |
|---|---|
| MODEL IDENTIFICATION | A PROCESS/METHOD OF IDENTIFYING AN AI/ML MODEL FOR THE COMMON UNDERSTANDING BETWEEN THE NW AND THE UE<br>NOTE: THE PROCESS/METHOD OF MODEL IDENTIFICATION MAY OR MAY NOT BE APPLICABLE.<br>NOTE: INFORMATION REGARDING THE AI/ML MODEL MAY BE SHARED DURING MODEL IDENTIFICATION. |

| TERMINOLOGY | DESCRIPTION |
|---|---|
| FUNCTIONALITY IDENTIFICATION | A PROCESS/METHOD OF IDENTIFYING AN AI/ML FUNCTIONALITY FOR THE COMMON UNDERSTAND-ING BETWEEN THE NW AND THE UE<br>NOTE: INFORMATION REGARDING THE AI/ML FUNCTIONALITY MAY BE SHARED DURING FUNCTIONALITY IDENTIFICATION.<br>FFS: GRANULARITY OF FUNCTIONALITY |

NOTE: WHETHER AND HOW TO INDICATE FUNCTIONALITY WILL BE DISCUSSED SEPARATELY.

FIG. 9

| CASE | MODEL DELIVERY/TRANSFER | MODEL STORAGE LOCATION | TRAINING LOCATION |
|---|---|---|---|
| y | MODEL DELIVERY (IF NEEDED) OVER-THE-TOP | OUTSIDE 3GPP NETWORK | UE-SIDE / NW-SIDE / NEUTRAL SITE |
| z1 | MODEL TRANSFER IN PROPRIETARY FORMAT | 3GPP NETWORK | UE-SIDE / NEUTRAL SITE |
| z2 | MODEL TRANSFER IN PROPRIETARY FORMAT | 3GPP NETWORK | NW-SIDE |
| z3 | MODEL TRANSFER IN OPEN FORMAT | 3GPP NETWORK | UE-SIDE / NEUTRAL SITE |
| z4 | MODEL TRANSFER IN OPEN FORMAT OF A KNOWN MODEL STRUCTURE AT UE | 3GPP NETWORK | NW-SIDE |
| z5 | MODEL TRANSFER IN OPEN FORMAT OF AN UNKNOWN MODEL STRUCTURE AT UE | 3GPP NETWORK | NW-SIDE |

NOTE: THE CASE DEFINITION IS ONLY FOR THE PURPOSE OF FACILITATING DISCUSSION AND DOES NOT IMPLY APPLICABILITY, FEASIBILITY, ENTITY MAPPING, ARCHITECTURE, SIGNALLING NOR ANY PRIORITIZATION.
NOTE: THE CASE DEFINITION IS NOT INTENDED TO INTRODUCE SUB-LEVELS OF LEVEL Z.
NOTE: OTHER CASES MAY BE INCLUDED FURTHER UPON INTEREST FROM COMPANIES.
FFS: Z4 AND Z5 BOUNDARY

FIG. 10

TABLE 1 COLLABORATION LEVEL CATEGORY

| COLLABORATION LEVEL CATEGORY | COLLABORATION | NETWORK ROLE | UE ROLE | POTENTIAL INFORMATION EXCHANGED BETWEEN UE AND NETWORK |
|---|---|---|---|---|
| LEVEL X: IMPLEMENTATION | AI/ML IS FULLY IMPLEMENTATION BASED | IMPLEMENTATION SPECIFIC BUILT IN AI/ML MODELS | IMPLEMENTATION SPECIFIC BUILT IN AI/ML MODELS | NONE |
| LEVEL Y: INFORMATION EXCHANGE | AI/ML USAGE WITHOUT MODEL TRANSFER.<br><br>INFORMATION EXCHANGE BETWEEN GNB AND UE FOR AI/ML USAGE.<br><br>MODEL TRAINING AT GNB OR UE. | UPDATE AI/ML MODEL/INFERENCE & RELATED PARAMETERS.<br><br>PROVIDE AI/ML MODEL/INFERENCE TUNING PARAMETERS TO UE.<br><br>MODEL TRAINING AT GNB. | UPDATE AI/ML MODEL /INFERENCE & RELATED PARAMETERS.<br><br>PROVIDE PARAMETERS FOR TUNNING OF AI/ML AT GNB.<br><br>MODEL TRAINING AT UE | - MODEL ASSISTANCE INFORMATION<br>- MODEL PARAMETER<br>- INFERENCE UPDATES FROM UE TO GNB AND VICE VERSA<br>- MODEL PERFORMANCE INFORMATION FROM UE TO GNB |
| LEVEL Z: MODEL EXCHANGE | MODEL EXCHANGE BETWEEN GNB AND UE.<br>MODEL UPDATE FROM EXTERNAL REPOSITORY. | TRANSFER AI/ML MODEL TO UE.<br>UPDATE OR DOWNLOAD NEW MODELS FROM REPOSITORY. | TRANSFER AI/ML MODEL TO GNB.<br>DOWNLOAD MODEL FROM GNB.<br>UPDATE OR DOWNLOAD NEW MODELS FROM REPOSITORY. | - INFORMATION FOR LEVEL Y<br>- INFORMATION USEFUL TO IDENTIFY A MODEL TO DOWNLOAD TO UE<br>- AI/ML MODEL DATA<br>- |

HANDLING DIFFERENT MANAGEMENT SCHEMES FOR COMMUNICATION CONTROL MODEL

RELATED APPLICATIONS

The present application is a National Phase of International Application Number PCT/JP2023/028113, filed Aug. 1, 2023, and claims priorities based on Japanese Patent Application No. 2023-022402, filed Feb. 16, 2023 and Japanese Patent Application No. 2023-062135, filed Apr. 6, 2023.

BACKGROUND OF THE INVENTION

1. Field of the Invention

The present disclosure relates to handling different management schemes for communication control model.

2. Description of the Related Art

Number, types, and applications of wireless communication devices, hereinafter also collectively referred to as communication device, represented by smartphones or Internet of Things (IoT) devices, continue to increase. Wireless communication standards also continue to be expanded or improved. The commercial service of the fifth-generation mobile communication system known as "5G", for example, started in 2018, and efforts still continue by 3GPP (Third Generation Partnership Project) for further developing its standards or specifications. Preliminary works have also started to develop new standards for "6G" or the sixth-generation mobile communication system, which would be the next-generation wireless communication standards following 5G.

With the development of technologies related to artificial intelligence (AI) or machine learning (ML), hereinafter also collectively referred to as AI/ML or AIML, the use of such AI/ML technologies for communication control in mobile communication networks is considered. Mobile communication networks are divided into two portions or two sides: the communication-device side, hereinafter also referred to as UE side, and the network side, hereinafter also referred to as NW side or base-station side. Here, UE (User Equipment) can be another name of communication device. The network side includes base stations that provide communication service to UE.

Patent Literature 1: US Patent Application Publication No. 2021/0168643

SUMMARY OF THE INVENTION

Various management schemes have been proposed to properly manage AI/ML models, hereinafter also referred to as communication control models, concerning communication control between a communication device and a network, on each of the communication-device side and the network side. It is likely that several different management schemes are eventually adopted in a wireless communication standard such as 5G, since each management scheme has its advantages and disadvantages. In such a case, it is likely that different management schemes are used on the communication-device side and the network side.

The present disclosure has been made in consideration of such circumstances for providing a communication control apparatus or the like that can appropriately handle different management schemes of a communication control model in the communication-device side and the network side.

A communication control apparatus in one embodiment of the present disclosure includes at least one processor that performs: in case a communication control model concerning communication control between a communication device and a network that provides communication service to the communication device can be managed by the communication device and the network under different management schemes, causing an ID associator to associate a communication-device-side ID of the communication control model managed by the communication device and a network-side ID of the communication control model managed by the network; and causing an identifying information provider to provide identifying information from at least one of the communication device and the network to the other of the communication device and the network to identify the correct communication control model in accordance with the association between the communication-device-side ID and the network-side ID.

According to the embodiment, the identifying information in accordance with the association between the communication-device-side ID of the communication control model managed by the communication device and the network-side ID of the communication control model managed by the network is provided from at least one of the communication device and the network to the other. The other of the communication device and the network that has received the identifying information can identify the correct communication control model in accordance with the association between the communication-device-side ID and the network-side ID. Therefore, appropriate communication control between the communication device and the network can be realized based on the communication control model, even if the other of the communication device and the network uses a different management scheme from the one of the communication device and the network that has transmitted the identifying information.

Another embodiment of the present disclosure is a communication control method. The communication control method performs by at least one processor: in case a communication control model concerning communication control between a communication device and a network that provides communication service to the communication device can be managed by the communication device and the network under different management schemes, associating a communication-device-side ID of the communication control model managed by the communication device and a network-side ID of the communication control model managed by the network; and providing identifying information from at least one of the communication device and the network to the other of the communication device and the network to identify the correct communication control model in accordance with the association between the communication-device-side ID and the network-side ID.

Further another embodiment of the present disclosure is a computer-readable medium storing a communication control program. The communication control program causes at least one processer to perform: in case a communication control model concerning communication control between a communication device and a network that provides communication service to the communication device can be managed by the communication device and the network under different management schemes, associating a communication-device-side ID of the communication control model managed by the communication device and a network-side ID of the communication control model managed by the network; and providing identifying information from at least one of the communication device and the network to the other of the communication device and the network to identify the correct communication control model in accordance with the association between the communication-device-side ID and the network-side ID.

It should be noted that any combination of the above components, or any conversion of the expression of the present disclosure among methods, devices, systems, storage media, computer programs and the like, are also encompassed within the present disclosure.

According to the present disclosure, different management schemes of a communication control model in the communication-device side and the network side can be appropriately handled.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows a first example of the association between UE-side ID and NW-side ID by the ID associator;

FIG. 4 shows a fourth example of the association between UE-side ID and NW-side ID by the ID associator;

FIG. 5 shows an example in which the ID associator includes information on the model ID as the UE-side ID in the information on the functionality ID as the NW-side ID;

FIG. 6 shows an example in which the ID associator includes information on the functionality ID as the NW-side ID in the information on the model ID as the UE-side ID;

FIG. 8 is a diagram in the proposal document;

FIG. 9 is a diagram in the proposal document;

FIG. 10 is a diagram in the proposal document;

DETAILED DESCRIPTION OF THE INVENTION

Figure 1:
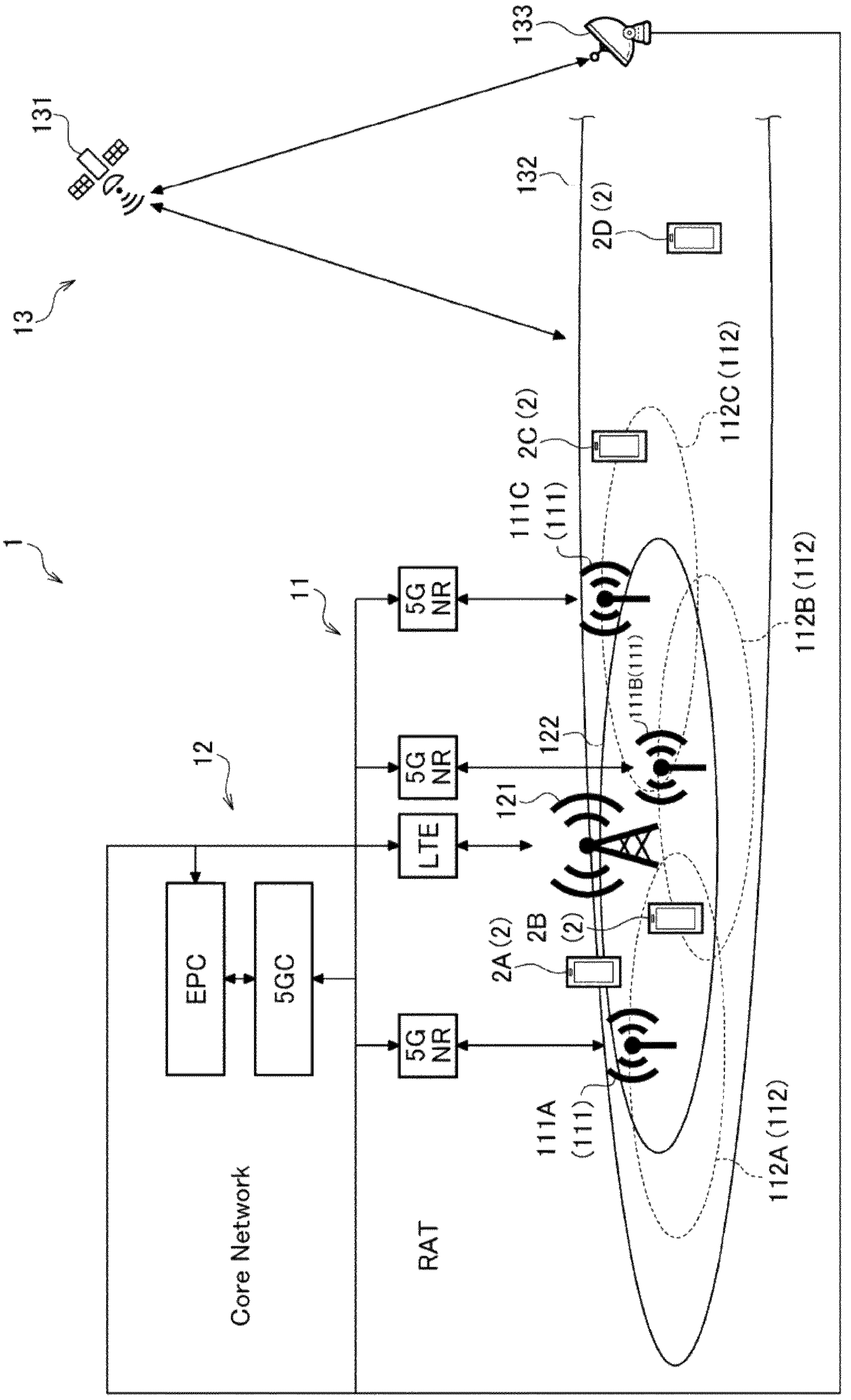
FIG. 1 schematically shows an overview of a wireless communication system to which the communication control apparatus is applied.

The following is a detailed description of an exemplary implementation of the present disclosure, hereinafter also referred to as embodiment, with reference to the drawings. In the description and/or the drawings, identical or equivalent components, parts, processes, and the like will be given the same symbol to omit duplicate descriptions. The scale or shape of each portion shown in the drawings is set for convenience to simplify the description. Therefore, any of them should not be interpreted as limiting unless otherwise noted. Such illustrative embodiments will not limit the coverage of the present disclosure in any way. Not all features presented in the embodiments or combinations thereof are necessarily essential to the present disclosure.

The presented embodiments are broken down into respective components to realize each function and/or each function group for convenience. However, one component in an embodiment may actually be realized by a combination of a plurality of separate components. Conversely, a plurality of components in an embodiment may actually be realized by a single united component. In the descriptions of the wireless communication system according to the present embodiment, the terms in existing wireless communication standards such as 5G are used for convenience. This is not intended to limit the present disclosure to 5G or the like. Rather, the present disclosure can be applied to future wireless communication systems such as 6G, even if technologies similar to the present disclosure are provided under different names.

FIG. 1 schematically shows an overview of a wireless communication system 1 to which the communication control apparatus according to an embodiment of the present disclosure is applied. The wireless communication system 1 includes a 5G wireless communication system 11, a 4G wireless communication system 12, and a satellite communication system 13. The 5G wireless communication system 11 complies with the fifth-generation mobile communication (5G) system. The 5G system uses NR (New Radio) or 5G NR (Fifth Generation New Radio) as the radio access technology (RAT), and uses 5GC (Fifth Generation Core) as the core network (CN). The 4G wireless communication system 12 complies with the fourth-generation mobile communication (4G) system. The 4G system uses LTE (Long Term Evolution) or LTE-Advanced as the radio access technology, and uses EPC (Evolved Packet Core) as the core network. The satellite communication system 13 handles satellite communication via a communication satellite 131. Although not shown in the figure, the wireless communication system 1 may include: wireless communication systems of a generation prior to 4G; wireless communication systems of a generation later than 5G such as 6G; and any wireless communication systems not associated with those generations such as Wi-Fi (registered trademark). The wireless communication system 1 may not include some or all of the 5G wireless communication system 11, the 4G wireless communication system 12, and the satellite communication system 13.

The 5G wireless communication system 11 includes a plurality of 5G base stations 111A, 111B, and 111C installed on the ground, hereinafter also collectively referred to as 5G base station 111. The 5G base station 111 can communicate through 5G NR with communication devices 2A, 2B, 2C, and 2D, hereinafter also collectively referred to as communication device 2. The communication device 2 such as smartphone is also referred to as UE (User Equipment) or UT (User Terminal). The 5G base station 111 is also referred to as gNodeB (gNB). The coverage or support range of the respective 5G base stations 111A, 111B, and 111C is referred to as a cell. The respective cells 112A, 112B, and 112C, hereinafter also collectively referred to as 5G cell 112, is illustrated in the figure.

The size of the 5G cell 112 by the 5G base station 111 is arbitrary, but typically ranges from a few meters to several tens of kilometers in radius. Although there is no established definition, a cell with a radius of a few meters to ten meters may be called a femtocell, a cell with a radius of ten meters to several tens of meters may be called a picocell, a cell with a radius of several tens of meters to several hundreds of meters may be called a microcell, and a cell with a radius of more than several hundreds of meters may be called a macrocell. In 5G, high frequency radio waves such as millimeter waves are often used. Their high tendency to propagate in a straight-line causes the radio waves to be blocked by obstacles, shortening the communication distance. For this reason, 5G tends to use more small cells than 4G and earlier generations.

The communication device 2 can perform the 5G communication when it is located within at least one of the plurality of 5G cells 112A, 112B, and 112C. In the example shown in the figure, the communication device 2B in the 5G cells 112A and 112B can communicate with both the 5G base stations 111A and 111B through 5G NR. The communication device 2C in the 5G cell 112C can communicate with the 5G base station 111C through 5G NR. The communication devices 2A and 2D cannot communicate through 5G NR, as they are outside of all the 5G cells 112A, 112B, and 112C. The 5G communication based on 5G NR between each communication device 2 and each 5G base station 111 is managed by the 5GC as the core network. For example, the 5GC: transfers data to and from each 5G base station 111; transfers data to and from external networks such as the EPC, the satellite communication system 13, and the Internet; and handles mobility management of the communication device 2.

The 4G wireless communication system 12 includes a plurality of 4G base stations 121 installed on the ground (only one of them is illustrated in FIG. 1). The plurality of 4G base stations 121 can communicate through LTE or LTE-Advanced with the communication device 2. The 4G base station 121 is also referred to as eNodeB (eNB). The coverage or support range of the respective 4G base stations 121 is referred to as a cell, similar to the respective 5G base stations 111. Such a 4G cell 122 is illustrated in the figure.

The communication device 2 can perform the 4G communication when it is located within the 4G cell 122. In the example shown in the figure, the communication devices 2A and 2B in the 4G cell 122 can communicate with the 4G base station 121 through LTE or LTE-Advanced. The communication devices 2C and 2D cannot communicate through LTE or LTE-Advanced, as they are outside of the 4G cell 122. The 4G communication based on LTE or LTE-Advanced between each communication device 2 and each 4G base station 121 is managed by the EPC as the core network. For example, the EPC: transfers data to and from each 4G base station 121; transfers data to and from external networks such as the 5GC, the satellite communication system 13, and the Internet; and handles mobility management of the communication device 2.

If we take a look at each communication device 2A, 2B, 2C, and 2D in the example shown in the figure, the communication device 2A can perform the 4G communication with the 4G base station 121, the communication device 2B can perform the 5G communication with the 5G base stations 111A and 111B and the 4G communication with 4G base station 121, and the communication device 2C can perform the 5G communication with the 5G base station 111C. In case one communication device 2 (e.g., 2B) can communicate with a plurality of base stations (e.g., 111A, 111B, and 121), one base station is selected under the control of the 5GC and/or the EPC as the core network. For example, one base station is selected as the most suitable for the communication device 2B based on communication quality or the like. The communication device 2D cannot perform the communication with any of the 5G base stations 111 nor any of the 4G base stations 121. Therefore, the communication device 2D would perform the communication through the satellite communication system 13 described below.

The satellite communication system 13 is a wireless communication system using communication satellites 131 as non-terrestrial base stations. The communication satellite 131 may be a low-earth-orbit satellite flying in the low-earth-orbit outer space with altitude of 500 to 700 km above the ground. The coverage or support range of the communication satellite 131 is referred to as a cell, similar to the 5G base station 111 and the 4G base station 121. Such a satellite communication cell 132 is illustrated in the figure. As such, the communication satellite 131 as a non-terrestrial base station provides a satellite communication cell 132 as a non-terrestrial communication cell onto the ground. The communication device 2 on the ground can perform the satellite communication when it is located within the satellite communication cell 132. The communication satellite 131 as the base station in the satellite communication system 13 can perform wireless communication with the communication device 2 within the satellite communication cell 132, similar to the 5G base station 111 in the 5G wireless communication system 11 and the 4G base station 121 in the 4G wireless communication system 12. Such a wireless communication between the communication satellite 131 and the communication device 2 may be performed directly or indirectly via an aircraft or the like. The radio access technology used by the communication satellite 131 for wireless communication with the communication device 2 in the satellite communication cell 132 may be: 5G NR used by the 5G base station 111; LTE or LTE-Advanced used by the 4G base station 121; or any other radio access technology available for the communication device 2. Therefore, the communication device 2 does not have to be equipped with any special functions or components for the satellite communication.

The satellite communication system 13 is equipped with a gateway 133 as a ground station installed on the ground. The gateway 133 can communicate with the communication satellite 131. The gateway 133 is equipped with a satellite antenna for communicating with the communication satellite 131. The gateway 133 is also connected to the 5G base station 111 or the 4G base station 121 as the terrestrial base station that constitutes a terrestrial network (TN). Such a connection between the gateway 133 and the terrestrial base station can be established via: the above radio access technology such as 5G NR and LTE; or another wired or wireless access technology or interface. In such a manner, the gateway 133 connects the non-terrestrial network (NTN) constituted by the communication satellite 131 as the non-terrestrial base station or the satellite base station, and the terrestrial network TN constituted by the terrestrial base station 111 and 121. That is, the mutual communication between the non-terrestrial network NTN and the terrestrial network TN can be established via the gateway 133. In case the communication satellite 131 performs the 5G communication with the communication device 2 in the satellite communication cell 132 through 5G NR, the 5GC is used as the core network. In such a case, the communication satellite 131 is connected to the 5GC via the gateway 133, and the communication device 2 is connected to the 5GC via the 5G base station 111 or the 5G radio access network in the TN. In case the communication satellite 131 performs the 4G communication with the communication device 2 in the satellite communication cell 132 through LTE or LTE-Advanced, the EPC is used as the core network. In such a case, the communication satellite 131 is connected to the EPC via the gateway 133, and the communication device 2 is connected to the EPC via the 4G base station 121 or the 4G radio access network in the TN. In such a manner, appropriate coordination is made among different wireless communication systems such as the 5G wireless communication system 11, the 4G wireless communication system 12, and the satellite communication system 13 via the gateway 133.

The satellite communication through the communication satellites 131 is mainly used for covering areas with no or few terrestrial base stations such as the 5G base station 111 and the 4G base station 121. In the example shown in the figure, the communication device 2D located outside all the communication cells by the terrestrial base stations would communicate with the communication satellite 131. On the other hand, the communication devices 2A, 2B, and 2C also located inside the satellite communication cell 132 would not communicate with the communication satellite 131 in principle, even if they can. This is because they are in good communication with either of the terrestrial base stations. As such, the communication devices 2A, 2B, and 2C would communicate with the terrestrial base stations instead of the communication satellite 131, thereby saving the limited communication resources including power of the communication satellite 131 for use by the communication device 2D or the like. The communication satellite 131 uses beamforming to direct the communication radio waves to the communication device 2D in the satellite communication cell 132, thereby improving the communication quality with the communication device 2D.

The size of the satellite communication cell 132 by the communication satellite 131 as the satellite base station depends on the number of beams emitted by the communication satellite 131. For example, the satellite communication cell 132 with a diameter of approximately 24 km can be formed by combining up to 2,800 beams. As illustrated, the satellite communication cell 132 is typically larger than a terrestrial communication cell such as the 5G cell 112 and the 4G cell 122. Such a satellite communication cell 132 could contain one or more 5G cells 112 and/or 4G cells 122 inside it. The above example shows the communication satellite 131 as a flying non-terrestrial base station, which flies in the low-earth-orbit outer space with altitude of 500 to 700 km above the ground. However, a communication satellite flying in the geostationary orbit or other higher orbit in outer space, or an unmanned or manned aircraft or a drone flying in the stratosphere or other lower (e.g., approximately 20 km above the ground) atmosphere may be used as a non-terrestrial base station in addition to or instead of the communication satellite 131.

Figure 2:
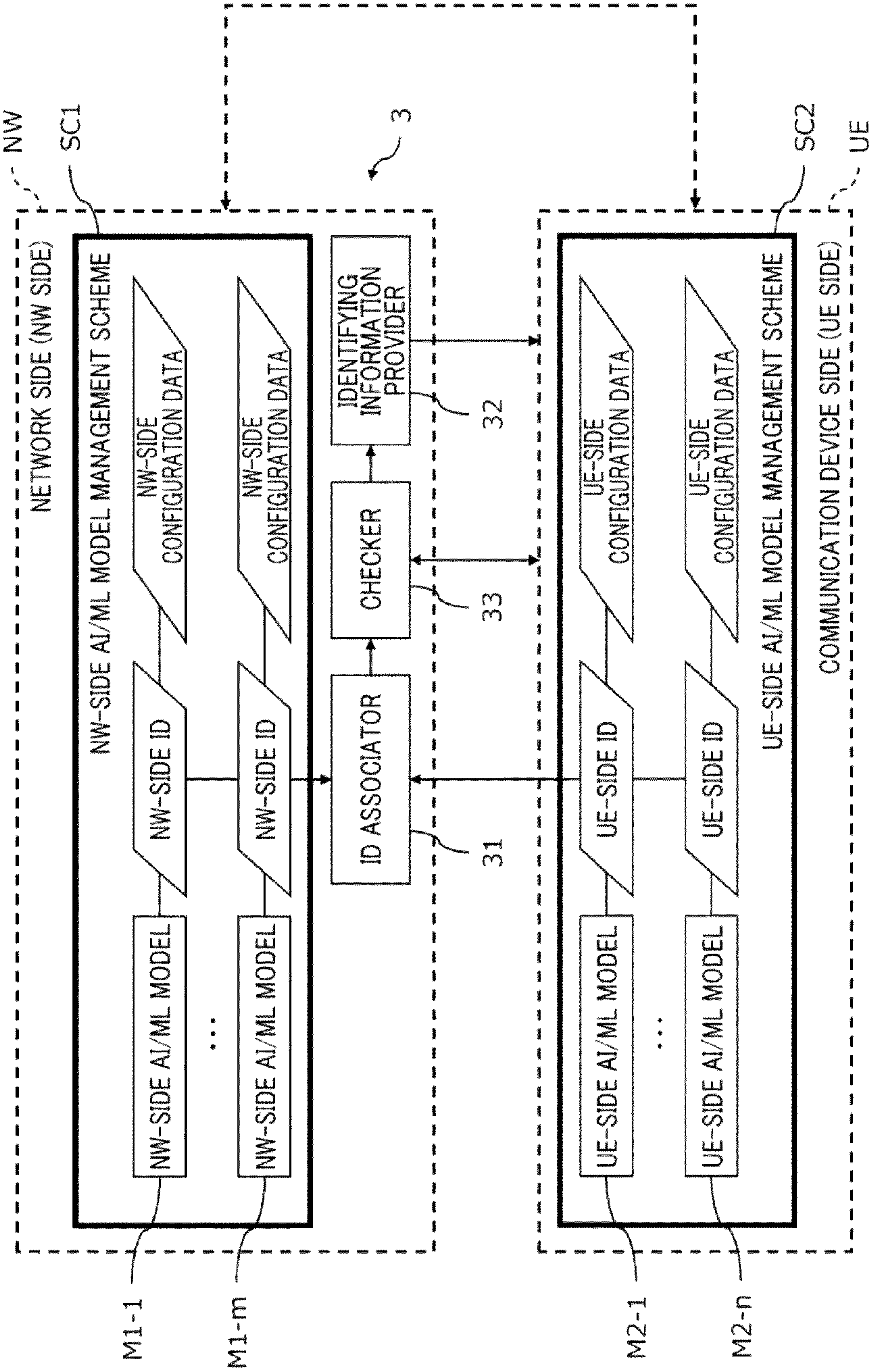
FIG. 2 is a functional block diagram of the communication control apparatus.

FIG. 2 is a functional block diagram of the communication control apparatus 3 according to the present embodiment. The communication control apparatus 3 includes an ID associator 31, an identifying information provider 32, and a checker 33. Some of the functional blocks can be omitted as long as the communication control apparatus 3 realizes at least some of the operations and/or the effects described below. The functional blocks are realized by the cooperation of hardware resources and software to be executed using them. Examples of such hardware resources include a central processing unit, a memory, an input device, and an output device of a computer, or a peripheral device connected to the computer. The types or the installation locations of the computer are freely selected. Each of the above functional blocks may be realized by hardware resources of a single computer, or by combining hardware resources distributed across a plurality of computers.

Especially in the present embodiment, some or all of the functional blocks of the communication control apparatus 3 may be realized in a centralized or distributed manner by computer or processor provided in at least one of: a communication device UE similar to the above communication device 2; a network NW including a radio access network (RAN) constituted by a base station similar to at least one of the above base stations 111, 121, and 131 and/or a core network; and unshown various communication stations (e.g., a relay station (a repeater), an IAB (Integrated Access and Backhaul) node, and the gateway 133) that constitute the RAN together with the base station.

As described below, in the present embodiment, at least one of the communication device UE and the network NW performs the main processes of the ID associator 31. In addition, such one of the communication device UE and the network NW performs the main processes of the identifying information provider 32 or the checker 33 for the other. For simplicity of the description, in the following example, the network NW functions as such one and the communication device UE functions as such other. Therefore, in FIG. 2 corresponding to such example, the ID associator 31, the identifying information provider 32, and the checker 33 are shown on the network NW side. However, the present disclosure can also be applied to the case in which the communication device UE functions as such one and the network NW functions as such other. In such a case, the communication device UE and the network NW in the following description may just be interchanged. Specifically, the main portions of the ID associator 31, the identifying information provider 32, and the checker 33 are provided on the communication device UE side (not shown).

In the present embodiment, the communication control between the communication device UE and the network NW that provides communication service to the communication device UE is performed utilizing an AI/ML model or a communication control model based on technologies related to AI/ML. In the communication control, both the network NW side and the communication device UE side are provided with AI/ML models corresponding to each other or cooperating with each other, for the required cooperation between the network NW and the communication device UE for mutual communication.

As schematically illustrated in the figure, one or more m (any natural number) network-side (NW-side) AI/ML models M1-1 to M1-*m* are provided on the network NW side for use by the network NW (e.g., the core network). The NW-side AI/ML models M1-1 to M1-*m* are also collectively referred to as NW-side AI/ML model M1 in the following. Besides, the NW-side AI/ML model is also referred to as NW-side model (M1) for simplicity. The NW-side model M1 available to the network NW is stored in storage inside or outside the network NW that is accessible by the network NW. Preferably, at least a portion of the NW-side model M1 available to the network NW (e.g., the frequently used portion) is stored in storage inside the network NW.

Similarly, one or more n (any natural number) communication-device-side (UE-side) AI/ML models M2-1 to M2-*n* are provided on the communication device UE side for use by the communication device UE. The UE-side AI/ML models M2-1 to M2-*n* are also collectively referred to as UE-side AI/ML model M2 in the following. Besides, the UE-side AI/ML model is also referred to as UE-side model (M2) for simplicity. The UE-side model M2 available to the communication device UE is stored in storage inside or outside the communication device UE that is accessible by the communication device UE. Preferably, at least a portion of the UE-side model M2 available to the communication device UE (e.g., the frequently used portion) is stored in storage inside the communication device UE.

One or more NW-side models M1 and/or one or more UE-side models M2 may be provided corresponding to various use cases in the communication control between the network NW and the communication device UE. Examples of the use case include: improving channel state information (CSI) feedback for e.g., reducing overhead, improving accuracy, and appropriate prediction; beam prediction in time domain and/or space domain for e.g., reducing overhead or delay, or beam management for e.g., improving beam selection accuracy; and improving positioning accuracy for different scenarios including, for example, severe Non-Line-Of-Site (NLOS) environment. For example, in case the network NW and the communication device UE cooperate in a certain use case, the network NW selects and deploys or executes one or more NW-side models M1 corresponding to such a use case, and the communication device UE selects and deploys or executes one or more UE-side models M2 corresponding to such a use case.

As such, the NW-side model M1 utilized on the network NW side and the UE-side model M2 utilized on the communication device UE side must be consistent with each other, in order for the network NW and the communication device UE to select their respective AI/ML models M1 and M2 for the cooperation. Here, it is easy to ensure the consistency when selecting the AI/ML models M1 and M2 on the network NW side and the communication device UE side based on a common ID or the like set under the same management scheme, if the respective AI/ML models M1 and M2 are managed under the same management scheme on the network NW side and the communication device UE side.

However, as concrete examples are shown below, the management schemes of the AI/ML models M1 and M2 (the communication control models) concerning the communication control between the network NW and the communication device UE are not unified, and various management schemes have been proposed. It is likely that several different management schemes are eventually adopted in a wireless communication standard such as 5G, since each management scheme has its advantages and disadvantages. In such a case, it is likely that different management schemes are used on the network NW side and the communication device UE side. Therefore, the present embodiment provides a communication control apparatus 3 that can appropriately handle different management schemes of the AI/ML models M1 and M2 on the network NW side and the communication device UE side.

It should be noted that the management scheme may be referred to as a life cycle management (LCM) scheme of an AI/ML model or a communication control model. The life cycle management scheme is a scheme, a system, or a framework for managing each of the AI/ML models at each phase in the life cycle or the lifetime of each of the AI/ML models. For example, an appropriate life cycle management scheme can be set up individually on the network NW side and on the communication device UE side for managing each of the AI/ML models consistently over each phase in its life cycle, such as generation, training, testing, deployment, monitoring, optimization, and abandonment of each of the AI/ML models.

As described below, the management scheme or the LCM scheme manages each of the AI/ML models based on an ID for uniquely identifying each of the AI/ML models or its component, and configuration data that configures or defines each of the AI/ML models or its component. The configuration data may be updated or modified as necessary throughout the life cycle of each of the AI/ML models. On the other hand, the ID is, in principle, unchanged throughout the life cycle (from generation to abandonment) of each of the AI/ML models.

In the following, the management scheme used by the network NW for managing its own NW-side model M1 is referred to as "NW-side AI/ML model management scheme" added with a symbol SC1. The NW-side AI/ML model management scheme SC1 is also simply referred to as the NW-side management scheme SC1 or the first scheme SC1. Similarly, the management scheme used by the communication device UE for managing its own UE-side model M2 is referred to as "UE-side AI/ML model management scheme" added with a symbol SC2. The UE-side AI/ML model management scheme SC2 is also simply referred to as the UE-side management scheme SC2 or the second scheme SC2.

One or more NW-side AI/ML models M1-1 to M1-*m* are managed under the first scheme SC1 on the network NW side. Each NW-side AI/ML model M1 includes a network-side ID (a NW-side ID) for uniquely identifying each of them and network-side configuration data (NW-side configuration data) that configures or defines each of them. It should be noted that the "NW-side AI/ML model" here means the entire NW-side AI/ML model or its component. In the former case, the NW-side ID uniquely identifies the entire NW-side AI/ML model, and the NW-side configuration data configures or defines the entire NW-side AI/ML model. In the latter case, the NW-side ID uniquely identifies the component of the NW-side AI/ML model (e.g., a functionality or a procedure described below), and the NW-side configuration data configures or defines the component of the NW-side AI/ML model. In such a latter case, an entire NW-side AI/ML model or its entire life cycle can be realized by combining typically a plurality of components.

One or more UE-side AI/ML models M2-1 to M2-*n* are managed under the second scheme SC2 on the communication device UE side. Each UE-side AI/ML model M2 includes a communication-device-side ID (a UE-side ID) for uniquely identifying each of them and communication-device-side configuration data (UE-side configuration data) that configures or defines each of them. It should be noted that the "UE-side AI/ML model" here means the entire UE-side AI/ML model or its component. In the former case, the UE-side ID uniquely identifies the entire UE-side AI/ML model, and the UE-side configuration data configures or defines the entire UE-side AI/ML model. In the latter case, the UE-side ID uniquely identifies the component of the UE-side AI/ML model (e.g., a functionality or a procedure described below), and the UE-side configuration data configures or defines the component of the UE-side AI/ML model. In such a latter case, an entire UE-side AI/ML model or its entire life cycle can be realized by combining typically a plurality of components.

The first scheme SC1 and the second scheme SC2 may become the same at least temporarily. However, in the following description in the present embodiment, the first scheme SC1 and the second scheme SC2 are different from each other. In other words, in the following description, the network NW and the communication device UE use different management schemes SC1 and SC2. Specifically in the following detailed example, the NW-side management scheme SC1 used by the network NW is a so-called functionality-based management scheme, and the UE-side management scheme SC2 used by the communication device UE is a so-called model-based management scheme.

However, the present disclosure is also applicable to the case in which the NW-side management scheme SC1 is any management scheme other than the functionality-based management scheme and the UE-side management scheme SC2 is any management scheme other than the model-based management scheme. Besides, although not shown in the figure, a plurality of different management schemes (e.g., both the functionality-based management scheme and the model-based management scheme) may be implemented in parallel on the network NW side or the communication device UE side.

It should be noted that the "functionality-based management scheme" or the "model-based management scheme" exemplified below is tentative or preliminary in the proposal phase or the discussion phase. Therefore, the names or contents of the respective management schemes may change significantly when they are finally adopted in wireless communication standards such as 5G. Besides, it is also possible that a management scheme different from the functionality-based management scheme or the model-based management scheme is proposed and finally adopted in wireless communication standards such as 5G. The present disclosure is broadly applicable to cases in which the network NW and the communication device UE could use different management schemes SC1 and SC2, regardless of the specific name or the specific content of each of such schemes.

With the above understanding, a functionality-based management scheme as an example of the NW-side management scheme SC1 and a model-based management scheme as an example of the UE-side management scheme SC2 will be specifically exemplified below. To begin with, the model-based management scheme SC2 will be specifically described, after which the functionality-based management scheme SC1 will be specifically described.

In the model-based management scheme SC2, a unique model ID or a UE-side ID is assigned to each entire UE-side AI/ML model. In other words, the model ID set under the model-based management scheme SC2 uniquely identifies the entire AI/ML model. The UE-side configuration data that may be referred to as the metadata of such a model ID may be the entire AI/ML model itself (e.g., a mathematical model based on artificial intelligence and/or machine learning that performs intelligent processing such as inference on inputs and outputs results), or it may be a set of all components of such a AI/ML model (e.g., parameters, functions, procedures). As such, the LCM or the like is performed in units of the entire AI/ML model under the model-based management scheme SC2. Therefore, the configuration of each of the AI/ML models is rigid and inflexible, compared to the functionality-based management scheme SC1 described below. On the other hand, the efficiency or the accuracy of processing can be dramatically improved by optimizing the AI/ML model in advance for routine processing with few changes or exceptions, for example, advantageously under the model-based management scheme SC2.

It should be noted that it is possible to make changes within the framework of each of the AI/ML models, for example, updating parameters or the like as components of each of the AI/ML models (the UE-side configuration data), even under the model-based management scheme SC2. In case parameters or the like of an existing AI/ML model are updated, a new AI/ML model with the updated parameters or the like may be generated and assigned a new model ID. Such a new model ID may be generated by incrementing a numeric sequence such as prefix and suffix as a portion of the model ID of the existing AI/ML model.

Under the model-based management scheme SC2 described above, one or more UE-side AI/ML models M2 are selected for actual usage on the communication device UE side, based on the capability concerning AI/ML of the communication device UE implementing the UE-side AI/ML models M2 or the use case that the communication device UE in cooperation with the network NW should support utilizing the AI/ML functions. Here, the communication device UE may autonomously (i.e., without any instruction or signaling from the network NW) select an appropriate UE-side AI/ML model M2, or it may select an appropriate UE-side AI/ML model M2 in accordance with instruction or signaling from the network NW.

In the functionality-based management scheme SC1, a unique functionality ID or a NW-side ID is assigned to a component of each NW-side AI/ML model. In other words, the functionality ID set under the functionality-based management scheme SC1 uniquely identifies the component of the AI/ML model. In contrast to the model-based management scheme SC2 described above, the configuration of each of the AI/ML models is not strictly defined or may be referred to as an open format under the functionality-based management scheme SC1. In such a case, the entire AI/ML model or its entire life cycle can be realized by combining individual functions or individual procedures identified by the functionality ID. As such, the component of the NW-side AI/ML model to which the functionality ID is assigned is responsible for a portion of the entire NW-side AI/ML model or its entire life cycle. For example, a functionality ID may be assigned to a function of the NW-side AI/ML model to be performed at a certain point in time, or a functionality ID may be assigned to a procedure concerning a phase in the life cycle of the NW-side AI/ML model.

For example, a function to which a functionality ID is assigned may specify the deployment architecture of the AI/ML model. Examples of the deployment architecture include the manner or the level of the cooperation of the network NW and the communication device UE when deploying the AI/ML model, and the entity (i.e., the network NW and/or the communication device UE) that leads such cooperation. Besides, a procedure to which a functional ID is assigned may be configured by one or more steps or processes concerning a phase in the life cycle of the AI/ML model. Examples of the step include an update of the AI/ML model, a transfer of the AI/ML model, and a monitoring of the AI/ML model. It should be noted that at least some of the steps may be performed by the communication device UE as a cooperation partner. Here, the individual steps realize only a portion of the LCM over the entire life cycle of the AI/ML model. However, the LCM over the entire life cycle of the AI/ML model can be effectively realized by selecting appropriate steps in accordance with the phases in the life cycle of the AI/ML model. The specific details or related parameters of the functions or the procedures described above are defined by the NW-side configuration data, which may be referred to as metadata of the functionality ID or the NW-side ID.

As described above, the LCM or the like is performed in units of a portion or a component of the entire AI/ML model or its entire life cycle under the functionality-based management scheme SC1. Therefore, the optimal AI/ML functions can be realized by flexibly selecting functions or procedures suitable for each phase in the life cycle of the AI/ML model. Such a highly flexible functionality-based management scheme SC1 is suitable for non-routine processing with many changes or exceptions, or processing that is easily affected by the capability or its level concerning AI/ML of the communication device UE or the network NW.

Under the functionality-based management scheme SC1 described above, functions or procedures of one or more NW-side AI/ML models M1 are selected for actual usage on the network NW side, based on the capability concerning AI/ML of the network NW implementing the NW-side AI/ML models M1 or the communication device UE as the cooperation partner, or the use case that the network NW in cooperation with the communication device UE should support utilizing the AI/ML functions. Here, the network NW may autonomously (i.e., without any instruction or signaling from the communication device UE) select an appropriate function or procedure of the NW-side AI/ML model M1, or it may select an appropriate function or procedure of the NW-side AI/ML model M1 in accordance with instruction or signaling from the communication device UE. The NW-side AI/ML model M1 actually used on the network NW side for the current use case is constructed by one or more functions or procedures thus selected.

Next, a communication control apparatus 3 will be described that can cope with the above situation in which the functionality-based management scheme SC1 is used on the network NW side and the model-based management scheme SC2 is used on the communication device UE side. As described above, the communication control apparatus 3 is equipped with an ID associator 31, an identifying information provider 32, and a checker 33.

The ID associator 31 associates the UE-side ID of the UE-side AI/ML model M2 (the entire model) managed by the communication device UE under the model-based management scheme SC2, and the NW-side ID of the NW-side AI/ML model M1 (the component such as a function or a procedure) managed by the network NW under the functionality-based management scheme SC1. The identifying information provider 32 provides identifying information from at least one of the communication device UE and the network NW (the network NW in the example of the present embodiment) to the other of the communication device UE and the network NW (the communication device UE in the example of the present embodiment) to identify the correct communication control model (the UE-side AI/ML model M2 in the example of the present embodiment) in accordance with the association between the UE-side ID and the NW-side ID associated by the ID associator 31. For example, the identifying information provider 32 provides identifying information from the network NW to the communication device UE to cause the communication device UE to identify one or more UE-side IDs (i.e., one or more corresponding UE-side AI/ML models M2), which correspond to the NW-side IDs of one or more NW-side AI/ML models M1 utilized on the network NW side.

There could be various examples as exemplified below for the embodiment of the association between the UE-side IDs and the NW-side IDs by the ID associator 31, and the corresponding embodiment of the identifying information by the identifying information provider 32.

FIG. 3 shows a first example of the association between the UE-side IDs and the NW-side IDs by the ID associator 31. In the present embodiment, the ID associator 31 provided on the network NW side generates an ID association table as the association information between the UE-side IDs and the NW-side IDs, as shown in FIG. 3. The ID association table of the example shown in the figure is constituted by three columns. The first column is a list of the model IDs (UE-side ID/Model ID) set under the model-based management scheme SC2 on the communication device UE side. The second column is a list of the functionality IDs (NW-side ID/Functionality ID) set under the functionality-based management scheme SC1 on the network NW side. The third column is a list of the model ID (NW-side ID/Model Set) set under the model-based management scheme on the network NW side, which are optionally set in case the network NW can use the model-based management scheme in addition to or instead of the functionality-based management scheme SC1.

The information in the first column concerning the communication device UE and the information in the third column concerning the network NW are both model IDs set under the model-based management scheme. However, the expression "Model Set" is used in the third column, meaning one or more (especially, multiple) model IDs, since it is likely that a plurality of the model IDs or the NW-side AI/ML models are set in the network NW handling various processes for a single model ID or the UE-side AI/ML model set on the communication device UE side.

The model IDs on the communication device UE side in the first column, the functionality IDs on the network NW side in the second column, and the model IDs (the model sets) on the network NW side in the third column are associated with each other by the ID associator 31. For example, in case the communication device UE uses the UE-side AI/ML model with the model ID "1", the network NW can cooperate with the communication device UE to realize the desired AI/ML functions by using the NW-side AI/ML model (i.e., a set of components such as functions or procedures) with the functionality ID "20" or the NW-side AI/ML model set with the model ID "B".

In the present embodiment, the identifying information provider 32 provided on the network NW side provides the model ID on the communication device UE side (the information in the first column), which is associated with the functionality ID (the information in the second column) or the model ID (the information in the third column) used by the network NW, to the communication device UE as the identifying information. For example, in case the network NW uses the NW-side AI/ML model (i.e., a set of components such as functions or procedures) with the functionality ID "20" or the NW-side AI/ML model set with the model ID "B", the corresponding model ID "1" on the communication device UE side is provided from the network NW to the communication device UE as the identifying information. As a result, the communication device UE can identify the correct UE-side AI/ML model M2 for cooperation with the network NW based on its own model ID "1" provided from the network NW as the identifying information.

In the first example described above, the communication-device-side ID (e.g., the model ID "1") and the network-side ID (e.g., the functionality ID "20" or the model ID "B") are different from each other. The identifying information provider 32 provides from the network NW to the communication device UE, the second ID used by the communication device UE (e.g., the model ID "1") as the identifying information, which is associated with the first ID used by the network NW (e.g., the functionality ID "20" or the model ID "B"), for cooperation of the communication device UE and the network NW. In such a case, only a small number of the model IDs extracted from the ID association table in FIG. 3, rather than the entire ID association table, are notified to the communication device UE from the network NW. This reduces the signaling load from the network NW to the communication device UE. Besides, the communication device UE can stably operate under its own model-based management scheme SC2, regardless of whether the network NW uses the functionality-based management scheme or the model-based management scheme.

In the second example, the information of the first column in FIG. 3 is used on both the communication device UE side and the network NW side. As described above, the information in the first column is primarily the model ID on the communication device UE side, but in the second example, it is also used as the functionality ID on the network NW side. For example, in the first example, the model ID "1" on the communication device UE side was associated with the functionality ID "20" on the network NW side, but in the second example, the model ID "1" on the communication device UE side is associated with the functionality ID "1" on the network NW side.

It should be noted that although such a common ID is apparently the same on the communication device UE side and the network NW side, its practical meaning differs on the communication device UE side and the network NW side. In other words, the common ID specifies the UE-side AI/ML model under the model-based management scheme SC2 on the communication device UE side, and specifies the NW-side AI/ML model (a set of components such as functions or procedures) under the functionality-based management scheme SC1 on the network NW side.

As described above, in the second example, the ID associator 31 sets the communication-device-side ID (e.g., the model ID "1") and the network-side ID (e.g., the functionality ID "1") to the same common ID (e.g., "1"). The identifying information provider 32 provides from the network NW to the communication device UE, the common ID as the identifying information, for cooperation of the communication device UE and the network NW. In such a case, only a small number of the model IDs extracted from the ID association table in FIG. 3, rather than the entire ID association table, are notified to the communication device UE from the network NW. This reduces the signaling load from the network NW to the communication device UE. Besides, the communication device UE can stably operate under its own model-based management scheme SC2, regardless of whether the network NW uses the functionality-based management scheme or the model-based management scheme.

In the third example, the information of the second column in FIG. 3 is used on both the communication device UE side and the network NW side. As described above, the information in the second column is primarily the functionality ID on the network NW side, but in the third example, it is also used as the model ID on the communication device UE side. For example, in the first example, the functionality ID "20" on the network NW side was associated with the model ID "1" on the communication device UE side, but in the third example, the functionality ID "20" on the network NW side is associated with the model ID "20" on the communication device UE side.

It should be noted that although such a common ID is apparently the same on the communication device UE side and the network NW side, its practical meaning differs on the communication device UE side and the network NW side. In other words, the common ID specifies the UE-side AI/ML model under the model-based management scheme SC2 on the communication device UE side, and specifies the NW-side AI/ML model (a set of components such as functions or procedures) under the functionality-based management scheme SC1 on the network NW side.

As described above, in the third example, the ID associator 31 sets the communication-device-side ID (e.g., the model ID "20") and the network-side ID (e.g., the functionality ID "20") to the same common ID (e.g., "20"). The identifying information provider 32 provides from the network NW to the communication device UE, the common ID as the identifying information, for cooperation of the communication device UE and the network NW. In such a case, only a small number of the model IDs extracted from the ID association table in FIG. 3, rather than the entire ID association table, are notified to the communication device UE from the network NW. This reduces the signaling load from the network NW to the communication device UE. Besides, the communication device UE can stably operate under its own model-based management scheme SC2, regardless of whether the network NW uses the functionality-based management scheme or the model-based management scheme.

FIG. 4 shows a fourth example of the association between the UE-side IDs and the NW-side IDs by the ID associator 31. In the present embodiment, the ID associator 31 provided on the network NW side generates an ID association table as the association information between the UE-side IDs and the NW-side IDs, as shown in FIG. 4. The ID association table of the example shown in the figure is constituted by three columns. The second column is a list of the model ID (one or more UE-side IDs/Model Set) set under the model-based management scheme SC2 on the communication device UE side. The third column is a list of the functionality ID (one or more NW-side IDs/Functionality Set) set under the functionality-based management scheme SC1 on the network NW side. The first column lists the set IDs corresponding to the sets of the model IDs on the communication device UE side in the second column and the functionality IDs on the network NW side in the third column.

The model ID on the communication device UE side in the second column and the functionality ID on the network NW side in the third column are associated with each other by the ID associator 31 via the set ID in the first column. For example, the model ID "B" on the communication device UE side in the second column and the functionality ID "b" on the network NW side in the third column are associated with each other by the ID associator 31 via the set ID "21" in the first column.

In the present embodiment, the identifying information provider 32 provided on the network NW side provides the set ID (the information in the first column), which is associated with the functionality ID (the information in the third column) used by the network NW, to the communication device UE as the identifying information. For example, in case the network NW uses the NW-side AI/ML model (i.e., a set of components such as functions or procedures) with the functionality ID "b", the corresponding set ID "21" is provided from the network NW to the communication device UE as the identifying information. The communication device UE recognizes the model ID "B" in its own model-based management scheme SC2 corresponding to the set ID "21" provided from the network NW. As a result, the communication device UE can identify the model ID "B" specifying the correct UE-side AI/ML model M2 for cooperation with the network NW that uses the NW-side AI/ML model (a set of components such as functions or procedures) with the functionality ID "b". It should be noted that the communication device UE does not need to know the entire ID association table in FIG. 4, but only the information of the set ID in the first column and the model ID in the second column. As such, the communication device UE does not need to know the information of the functionality ID in the third column.

In the fourth example described above, the set ID (e.g., "21") is set for integrally managing the communication-device-side ID (e.g., the model ID "B") and the network-side ID (e.g., the functionality ID "b"). The identifying information provider 32 provides from the network NW to the communication device UE, the set ID (e.g., "21") as the identifying information, for cooperation of the communication device UE and the network NW. In such a case, only a small number of the set IDs extracted from the ID association table in FIG. 4, rather than the entire ID association table, are notified to the communication device UE from the network NW. This reduces the signaling load from the network NW to the communication device UE. Besides, the communication device UE can stably operate under its own model-based management scheme SC2, regardless of whether the network NW uses the functionality-based management scheme or the model-based management scheme.

In the fifth example, the ID associator 31 generates the association information between the UE-side IDs and the NW-side IDs, and the identifying information provider 32 provides the association information as the identifying information from the network NW to the communication device UE. For example, the ID associator 31 may generate the ID association table shown in FIG. 3 or FIG. 4 as the association information, and the identifying information provider 32 may provide the entire ID association table from the network NW to the communication device UE. In such a way, the communication device UE recognizes the entire ID association table. Therefore, the communication device UE that has been provided with the information of the functionality ID under the functionality-based management scheme SC1 used on the network NW side, can associate the provided functionality ID to the correct model ID under the model-based management scheme SC2 used by the communication device UE.

In the sixth example, the ID associator 31 includes, in the information on one of the corresponding UE-side ID and the NW-side ID, the information on the other, and the identifying information provider 32 provides the information on the one as the identifying information from the network NW to the communication device UE.

FIG. 5 shows an example in which the ID associator 31 includes the information of the model ID as the UE-side ID (Applied model ID set) in the information of the functionality ID as the NW-side ID. In such a way, the information of the functionality ID integrated with the information of the model ID on the communication device UE side is provided to the communication device UE by the identifying information provider 32. Therefore, the communication device UE can extract the information of the model ID to be used (Applied model ID set) from the identifying information.

FIG. 6 shows an example in which the ID associator 31 includes the information of the functionality ID as the NW-side ID in the information of the model ID as the UE-side ID. In such a way, the information of the model ID integrated with the information of the functionality ID on the network NW side is provided to the communication device UE by the identifying information provider 32. Therefore, the communication device UE can directly select the UE-side AI/ML model to be used based on the model ID. On the other hand, the network NW can correctly select the NW-side AI/ML model (a set of components such as functions or procedures) to be used based on the information of the functionality ID integrated with the information of the model ID.

The first example to the sixth example described above are suitable in case the communication device UE (using the model-based management scheme SC2) and the network NW (using the functionality-based management scheme SC1) use different management schemes. The checker 33 shown in FIG. 2 may check whether the communication device UE and the network NW actually manage the AI/ML model or the communication control model under different management schemes, before applying the first example to the sixth example. Then, the identifying information provider 32 may provide the identifying information based on at least one of the first example to the sixth example from the network NW to the communication device UE, in case the checker 33 has confirmed that the communication device UE and the network NW actually manage the AI/ML model under different management schemes.

In the present embodiment, the checker 33 provided on the network NW side may check the management scheme of the AI/ML model that the communication device UE can support. For example, the communication device UE may notify the network NW or the checker 33 of the management scheme of the AI/ML model that can be supported by itself, in response to a query from the network NW or the checker 33 (or spontaneously). The signaling from the communication device UE to the network NW for such a purpose may be referred to as "AI/ML LCM capability information" (AI/ML life cycle management capability information) or the like, since it indicates the capability concerning the LCM of the AI/ML model held by the communication device UE.

The following are examples of the types of the management schemes of the AI/ML models that can be supported by the UE:

- Model-based management scheme (updatable)/configurable model
- Model-based management scheme (not updateable)/fixed model
- Functionality-based management scheme (updatable)/configurable LCM process (functionality)
- Functionality-based management scheme (not updateable)/fixed LCM process (functionality)

For example, in case the checker 33 has confirmed that the communication device UE can support only the model-based management scheme (i.e., cannot support the functionality-based management scheme), the network NW or the identifying information provider 32 using the functionality-based management scheme SC1 will provide the identifying information based on at least one of the first example to the sixth example to the communication device UE. In such a way, the information of the NW-side ID or the NW-side AI/ML model used on the network NW side is appropriately converted into the information of the UE-side ID or the UE-side AI/ML model used on the communication device UE side via the identifying information by the identifying information provider 32.

On the other hand, in case the checker 33 has confirmed that the communication device UE can support the functionality-based management scheme, the network NW, which also uses the functionality-based management scheme SC1, provides the information of the NW-side ID or the NW-side AI/ML model used by itself to the communication device UE. The communication device UE can appropriately select the UE-side ID or the UE-side AI/ML model to be used from the information of the NW-side ID under the functionality-based management scheme used by itself.

Figure 7:
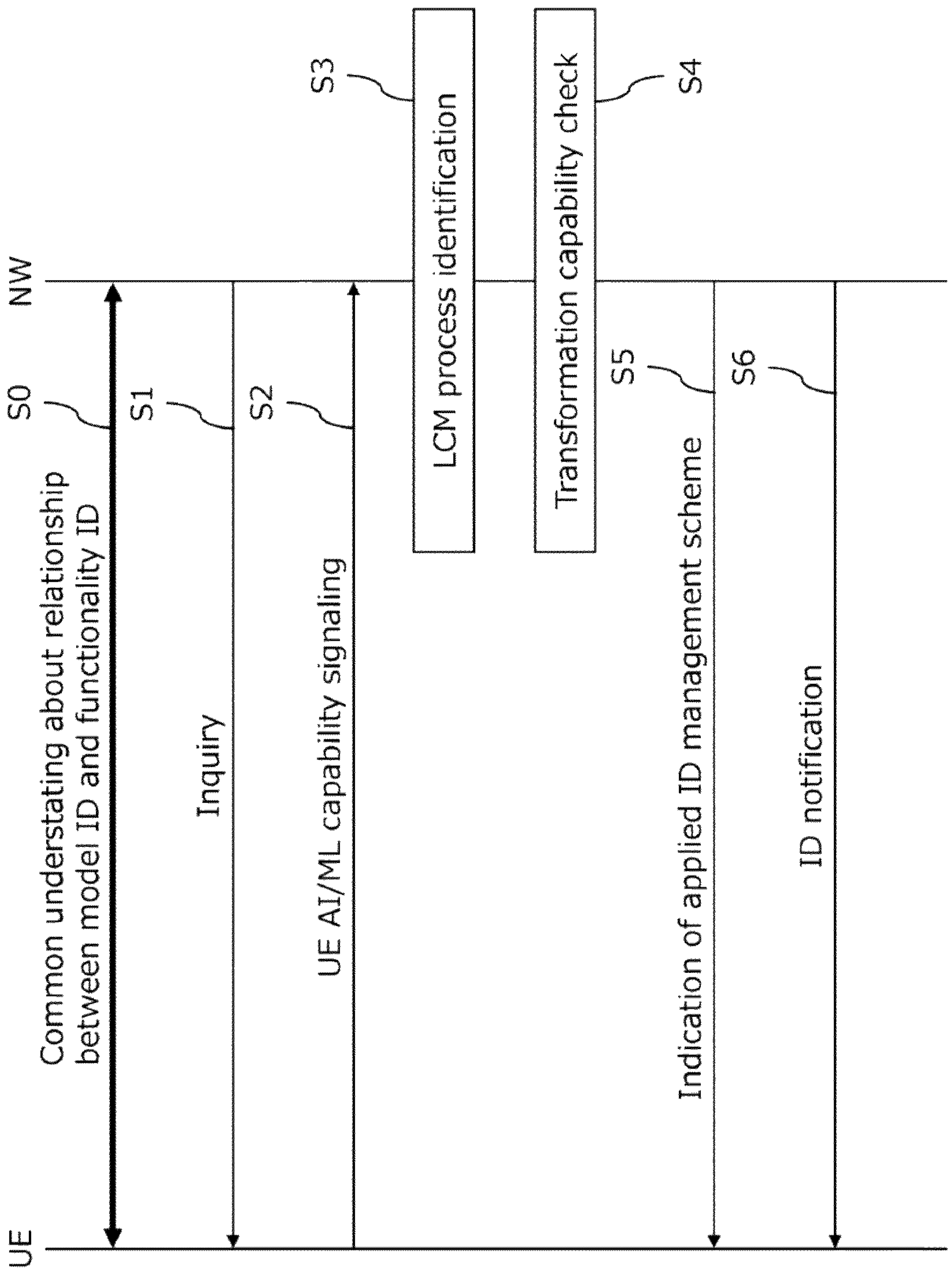
FIG. 7 schematically illustrates processes by a communication device and/or a network.

FIG. 7 schematically illustrates the above processes by the communication device UE and/or the network NW. In the present figure, time progresses from top to bottom. Besides, "S" in the present figure means a step or a process.

In S0, at least a portion of the association information such as the ID association table shown in FIG. 3 or FIG. 4 has been shared in advance between the communication device UE and the network NW. It should be noted that, as described with respect to the first example to the fourth example, the network NW is typically aware of the entire association information, but the communication device UE does not need to be aware of the entire association information as long as it can identify the UE-side ID to be used based on the association information. In other words, the communication device UE needs to be aware of only the fragment of the association information.

In S1, the checker 33 on the network NW side inquires the management scheme of the AI/ML model that the communication device UE can support. In S2, in response to the inquiry in S1, the communication device UE notifies the network NW or the checker 33 of the management scheme of the AI/ML model that can be supported by itself in the form of the "UE AI/ML capability signaling". The signaling includes, for example, the information concerning the AI/ML processing capability of the communication device UE or the AI/ML type that the communication device UE can support.

In S3, the network NW identifies the LCM process to be executed based on the signaling in S2. In S4, the checker 33 checks the management scheme of the AI/ML model that the communication device UE can support for the LCM process identified in S3, based on the signaling in S2. S4 may also be referred to as "Transformation capability check" as shown in the figure, since S4 is a process to check the necessity of the transformation between different management schemes of the UE-side ID and the NW-side ID.

In S5, the identifying information provider 32 notifies the communication device UE of the ID management scheme to be applied on the communication device UE side based on the check result in S4. For example, in case the checker 33 or S4 has confirmed that the communication device UE can support only the model-based management scheme, as described above, the network NW or the identifying information provider 32 notifies that the model-based management scheme should be applied on the communication device UE side. Alternatively, the notification may be omitted because the communication device UE can support only the model-based management scheme in any case. Besides, in case the checker 33 or S4 has confirmed that the communication device UE can support the functionality-based management scheme, the network NW, which also uses the functionality-based management scheme SC1, notifies that the functionality-based management scheme should be applied on the communication device UE side. It should be noted that in case the checker 33 or S4 has confirmed that the communication device UE can support only the functionality-based management scheme (i.e., cannot support the model-based management scheme), the notification may be omitted.

In S6, the network NW notifies the communication device UE of UE-side ID or its identifying information in accordance with the ID management scheme notified in S5. As a result, the communication device UE can appropriately select the correct UE-side ID or the UE-side AI/ML model corresponding to the NW-side ID or the NW-side AI/ML model used on the network NW side.

According to the present embodiment, the identifying information in accordance with the association between the UE-side ID of the communication control model or the UE-side AI/ML model managed by the communication device UE and the NW-side ID of the communication control model or the NW-side AI/ML model managed by the network NW is provided from at least one of the communication device UE and the network NW to the other. The other of the communication device UE and the network NW that has received the identifying information can identify the correct communication control model in accordance with the association between the UE-side ID and the NW-side ID. Therefore, appropriate communication control between the communication device UE and the network NW can be realized based on the communication control model, even if the other of the communication device UE and the network NW uses a different management scheme from the one of the communication device UE and the network NW that has transmitted the identifying information.

The following shows a proposal document concerning the present embodiment. Any elements disclosed in the present proposal document constitutes a portion of the present disclosure and may be freely combined with the elements disclosed in the present embodiment described above.

3GPP TSG RAN WG1 #112bis-e

R1-23xxxxx e-Meeting

Apr. 17-Apr. 26, 2023

Source: Rakuten Mobile Inc.

Title: Discussion on AI/ML Framework

Agenda: 9.2.1

Document for: Discussion

1 Background

In RAN Plenary #94, 3GPP has agreed to study on Artificial Intelligence (AI)/Machine Learning (ML) for NR Air Interface, including following objectives [1]:

AI/ML model, terminology, and description to identify common and specific characteristics for framework investigations:

- Characterize the defining stages of AI/ML related algorithms and associated complexity:
  - Model generation, e.g., model training (including input/output, pre-/post-process, online/offline as applicable), model validation, model testing, as applicable
  - Inference operation, e.g., input/output, pre-/post-process, as applicable
- Identify various levels of collaboration between UE and gNB pertinent to the selected use cases, e.g.,
  - No collaboration: implementation-based only AI/ML algorithms without information exchange [for comparison purposes]
  - Various levels of UE/gNB collaboration targeting at separate or joint ML operation.
- Characterize life cycle management of AI/ML model: e.g., model training, model deployment, model inference, model monitoring, model updating
- Dataset(s) for training, validation, testing, and inference
- Identify common notation and terminology for AI/ML related functions, procedures and interfaces
- Note: Consider the work done for FS_NR_ENDC_data_collect when appropriate Based on the objective, it is necessary to discuss framework of AI/ML deployment. In RAN1 #109-e meeting, the following agreement has been made for AI/ML collaboration level:

Agreement

Take the following network-UE collaboration levels as one aspect for defining collaboration levels 1. Level x: No collaboration
2. Level y: Signaling-based collaboration without model transfer
3. Level z: Signaling-based collaboration with model transfer Note: Other aspect(s), for defining collaboration levels is not precluded and will be discussed in later meetings, e.g., with/without model updating, to support training/inference, for defining collaboration levels will be discussed in later meetings FFS: Clarification is needed for Level x-y boundary In RAN1 #110bis-e meeting, related with the agreement above, further clarification of the boundary among collaboration levels were discussed.

Working Assumption

Define Level y-z boundary based on whether model delivery is transparent to 3gpp signalling over the air interface or not.

Note: other procedures than model transfer/delivery are decoupled with collaboration level y-z Clarifying note: Level y includes cases without model delivery.

Agreement

Clarify Level x/y boundary as:

Level x is implementation-based AI/ML operation without any dedicated AI/ML-specific enhancement (e.g., LCM related signalling, RS) collaboration between network and UE. (Note: The AI/ML operation may rely on future specification not related to AI/ML collaboration. The AI/ML approaches can be used as baseline for performance evaluation for future releases.)

Since the definition of level x was clarified, RAN1 needs to continue discussion about boundary between y and z. A key difference between y and z based on the definition is the existence of model transfer. So far such handling of AI/ML model is performed based on Model ID. For the Model ID, RAN1 has made the following agreement in RAN1 #110bis-e meeting.:

Agreement

Study LCM procedure on the basis that an AI/ML model has a model ID with associated information and/or model functionality at least for some AI/ML operations [when network needs to be aware of UE AI/ML models] FFS: Detailed discussion of model ID with associated information and/or model functionality.

FFS: usage of model ID with associated information and/or model functionality-based LCM procedure FFS: whether support of model ID FFS: the detailed applicable AI/ML operations Agreement For model selection, activation, deactivation, switching, and fallback at least for UE sided models and two-sided models, study the following mechanisms:

Decision by the network

Network-initiated

UE-initiated, requested to the network

Decision by the UE

Event-triggered as configured by the network, UE's decision is reported to network UE-autonomous, UE's decision is reported to the network UE-autonomous, UE's decision is not reported to the network FFS: for network sided models FFS: other mechanisms In RAN1 #111 meeting, there was further discussion about framework of AI/ML model management, and new terminology "functionality" was provided as follows:

Agreement

For UE-part/UE-side models, study the following mechanisms for LCM procedures:

For functionality-based LCM procedure: indication of activation/deactivation/switching/fallback based on individual AI/ML functionality Note: UE may have one AI/ML model for the functionality, or UE may have multiple AI/ML models for the functionality.

FFS: Whether or how to indicate Funtionality

For model-ID-based LCM procedure, indication of model selection/activation/deactivation/switching/fallback based on individual model IDs Working Assumption (See FIG. 8)

Agreement

To facilitate the discussion, consider at least the following Cases shown in FIG. 9 for model delivery/transfer to UE, training location, and model delivery/transfer format combinations for UE-side models and UE-part of two-sided models.

Agreement

For UE-side models and UE-part of two-sided models:

For AI/ML functionality identification

Reuse legacy 3GPP framework of Features as a starting point for discussion.

UE indicates supported functionalities/functionality for a given sub-use-case.

UE capability reporting is taken as starting point.

For AI/ML model identification

Models are identified by model ID at the Network. UE indicates supported AI/ML models.

In functionality-based LCM

Network indicates activation/deactivation/fallback/switching of AI/ML functionality via 3GPP signaling (e.g., RRC, MAC-CE, DCI).

Models may not be identified at the Network, and UE may perform model-level LCM.

Study whether and how much awareness/interaction NW should have about model-level LCM In model-ID-based LCM, models are identified at the Network, and Network/UE may activate/deactivate/select/switch individual AI/ML models via model ID.

FFS: Relationship between functionality identification and model identification

FFS: Performance monitoring and RAN4 impact

FFS: detailed understanding on model

Agreement

AI/ML-enabled Feature refers to a Feature where AI/ML may be used.

Agreement

For functionality identification, there may be either one or more than one Functionalities defined within an AI/ML-enabled feature.

In this paper, we give our view about further clarification on collaboration level boundary, utilization of Model ID and model functionality.

2 Discussion on categorization of collaboration level of AI/ML usage in Air Interface.

In Table 1 (see FIG. 10), we describe our understanding of the features for each collaboration level.

We consider level x is sufficiently clarified and no need for further discussion.

Level y: Signalling-based collaboration without model transfer

In this collaboration level, various kinds of information exchange can be considered. Concerning the actual information shared between network and UE, multiple types of information can be assumed:

a. AI/ML assistant information i. Parameter(s) for tuning AI/ML model/inference ii. Parameter(s) to control AI/ML functionality application b. Indication of the necessity to update the AI/ML model Our understanding of the agreed categorization is to classify the impact of standardization in terms of signaling specification. In order to discuss necessary signaling further for Level y, it is necessary to clarify what kinds of collaborations are included in this collaboration level. In our understanding, in level y, the following collaborations are included:

Level y-1: NW Based AI/ML Application

All of the AI/ML related functionality is on NW except for measurement function at UE side. UE may report necessary measurement information to NW.

Level y-2: Dual-Sided AI/ML Application

Both NW and UE play some parts of role for AI/ML operations, including learning, inference, model management and so on. Details and feasibility of this level should be studied further.

Level y-3: UE Based AI/ML Application

All of the AI/ML related functionality is on UE except for some measurement function at NW side. NW may indicate necessary measurement information to UE.

The above category may be defined independently, in that case, the above categorization can be called as framework.

Level z: Signalling-Based Collaboration with Model Transfer

In this level, NW can manage the model UE uses for AI/ML operation. Learning can be done mainly at NW side and resulting updated model can be sent to UE. Operation with opposite direction is also possible from technical perspective. In our opinion, the first priority of this collaboration level is to specify the interaction between network and UE about management of the AI/ML models, which are aligned with common data format. Based on the common data format, 3GPP can discuss how to manage model parameters, how to conduct model update, how to inform of necessary assistant information.

There is another possibility to download the 3rd party AI/ML model from the internet to UE or a network node. In previous meeting, as further categorization, collaboration levels, in which model transaction is done based on proprietary format. In our understanding, controllability of the proprietary format model is not clear at this moment.

Observation 1

If it is enabled for proprietary format model to interact 3GPP system, common interface has to be specified even if it is proprietary format based AI/ML model.

Concerning the following working assumption about boundary between y-z, we are fine to make it as an agreement:

Working Assumption

- Define Level y-z boundary based on whether model delivery is transparent to 3gpp signalling over the air interface or not.
- Note: other procedures than model transfer/delivery are decoupled with collaboration level y-z
- Clarifying note: Level y includes cases without model delivery.

In our opinion, for this study item phase, as described in the WA, any procedures except for the model transfer/delivery can be discussed independently from the collaboration level discussion.

Proposal 2

Confirm the Following Working Assumption:

- Define Level y-z boundary based on whether model delivery is transparent to 3gpp signalling over the air interface or not.
- Note: other procedures than model transfer/delivery are decoupled with collaboration level y-z
- Clarifying note: Level y includes cases without model delivery.

Proposal 3

Further clarification of the AI/ML collaboration Level y includes:

- Level y-1: NW based AI/ML application
- Level y-2: Dual-sided AI/ML application
- Level y-3: UE based AI/ML application
- The above clarification can be independently defined as framework, instead of clarification of the collaboration levels.

Proposal 4

For collaboration level z, controllable model parameters should be aligned with collaboration level y.

3 Discussion on Model and Functionality Identification

As shown in Section 1, RAN1 has agreed to utilize model ID for life cycle management. However, the detail of how to handle each step for LCM is still one of the FFS points. From our perspective, model ID can be utilized in multiple areas in LCM. We explain how the model ID can be utilized in the following areas.

AI/ML Model Parameter Exchange

Based on the communication device UE AI/ML capability, NW can configure UE with necessary parameter indication, or UE can notify UE about necessary information in response to the request from NW. For example, such parameter sets can be predefined, and categorized as index. Such index for model parameter exchange may be defined as Model ID.

Observation 1: Model ID is Useful for AI/ML Model Parameter Exchange.

Model Update/Upgrade

Based on UE's AI/ML Model Repository, the following procedure may be applied:

(i) New model update,
(ii) Existing model upgrade,
(iii) Inference update,
(iv) Model training.

For the model update/upgrade, one of the discussion points is how to effectively manage history of model update/upgrade. To realize the management of the history of the model, it is beneficial to assign ID to each model.

Observation 2: Model ID is useful for Model update/upgrade.

Performance Monitoring, Model Training Based on Model performance feedback, based on KPI evaluated, gNB can perform one of the following actions.

(i) New model update,
(ii) Existing model upgrade,
(iii) Inference update,
(iv) No action,
(v) Model training.

To realize the procedure related with model, monitoring of KPI should be done with awareness of the model currently applied at NW and/or UE. In that sense, model ID is necessary to realize performance monitoring and model training.

Proposal 5

Performance monitoring should be done with awareness of model ID.

Observation 3: Model ID is useful for performance monitoring and model training.

As we discussed above, model ID could be a key role to conduct life cycle management in many procedures. Since at collaboration level z, both the network and UE should be aware of the model to exchange, model ID is beneficial to handle procedures above. For collaboration level y, applicability of model ID depends on what kind of information is shared between gNB and UE.

Observation 4: Model ID is useful at least for collaboration level z.

Observation 5: Model ID may be defined as either a set of model parameters or model data.

Another point for the model ID is who will manage the model ID. At least, we consider there are both cases of gNB signaling and UE signaling. In case of gNB signalling, as an example, the network can indicate model id to indicate model for UE to deploy. For the case of UE signalling, UE can indicate network about the model that the communication device UE deploys. At least in case of collaboration level z, both cases are beneficial for the network to manage the model in the system.

Proposal 6

Both gNB and UE can indicate model ID depending on the framework deployed.

According to R1-2212326, one of the purposes of model functionality is to manage supported collaboration levels depending on e.g., UE's mobility, or size of the area where one or multiple AI/ML models should support. Therefore, management of the relationship between functionality ID and model ID is necessary. Such configuration may be predefined in spec or configured by signaling, depending on the use cases to apply AI/ML.

In addition to the relationship between functionality and AI/ML model, functionality has to be defined based on necessary collaboration level because the collaboration level is strongly related with AI/ML LCM framework to apply. Possible collaboration level is different depending not only on UE's capability but e.g., UE's mobility, number of UEs managed by the AI/ML operation, and the size of area to support. Therefore, the functionality may change time by time depending on the UEs' situation.

As agreed in the previous meeting, the model id can be indicated as a part of functionality id. However, it is not clear whether it is possible to whole related parameters with functionality ID needs to be updated every time, depending on the change e.g., in mobility of UEs. Therefore, in addition to the management based on functionality ID, it is necessary to keep the way to update AI/ML related parameters separately, in case it is necessary.

Observation 6

Exact set of the parameters for a functionality can be defined depending on the use cases.

Proposal 7

Model ID should be able to be indicated separately with functionality ID, in addition to the indication within functionality ID.

The functionality is "A process/method of identifying an AI/ML functionality for the common understanding between the NW and the UE." Therefore, it should include all the necessary parameter to perform collaboration between the NW and the UE. At least the following parameters should be included:

Model ID

Collaboration Level

Proposal 8

Functionality should be related with the model ID and the collaboration level.

Figure 11:
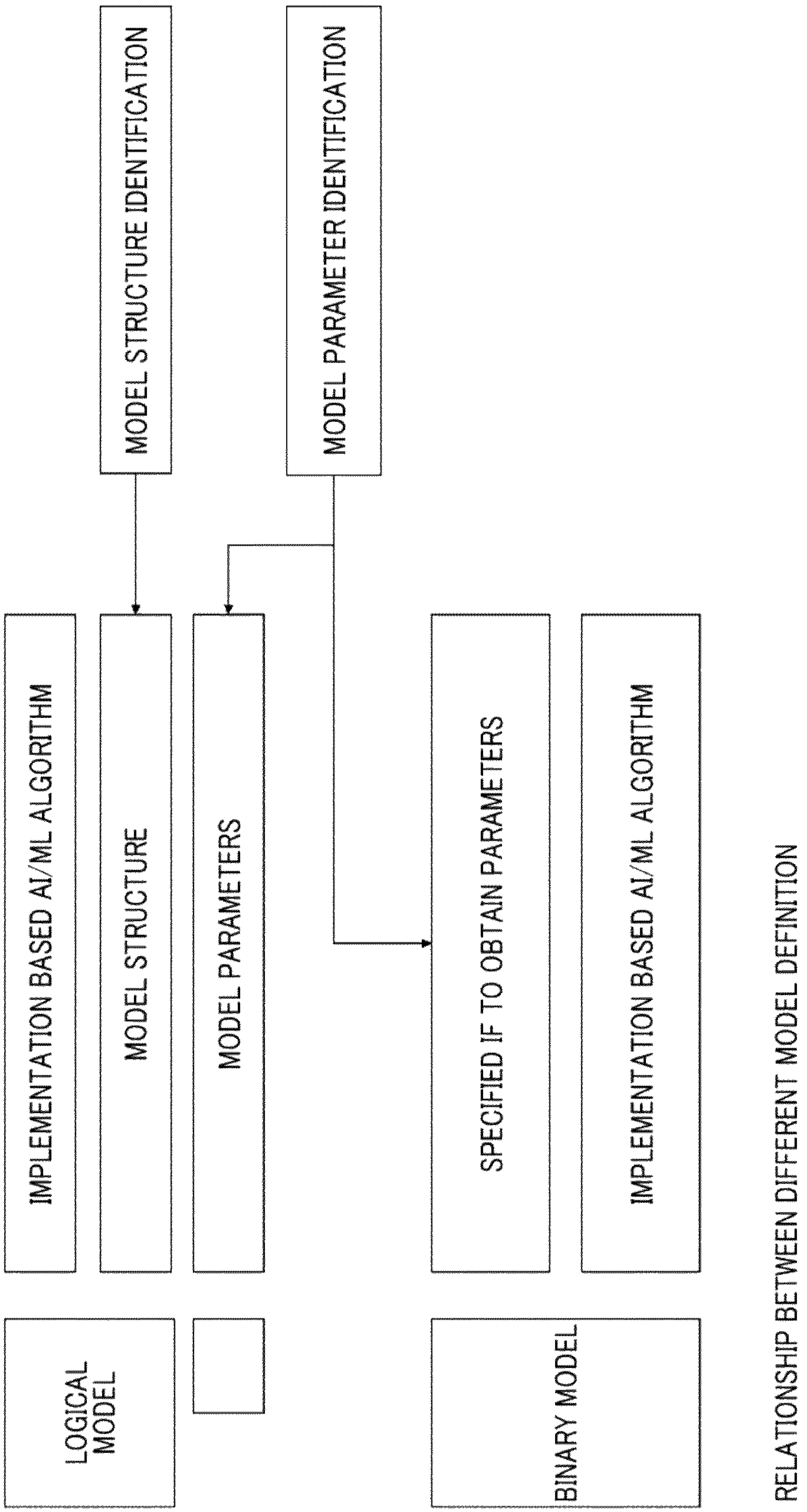
FIG. 11 is a diagram in the proposal document.

Concerning the terminology definition of the model and functionality, there are different views depending on companies. In FIG. 11, summary of the different terminology from our perspective is depicted.

In our understanding, functionality identification is strongly related with model structure identification because model structure is decided based on the use cases and AI/ML capability of UEs. Therefore, if structure identification is necessary, it should be performed as functionality identification before model identification.

Figure 12:
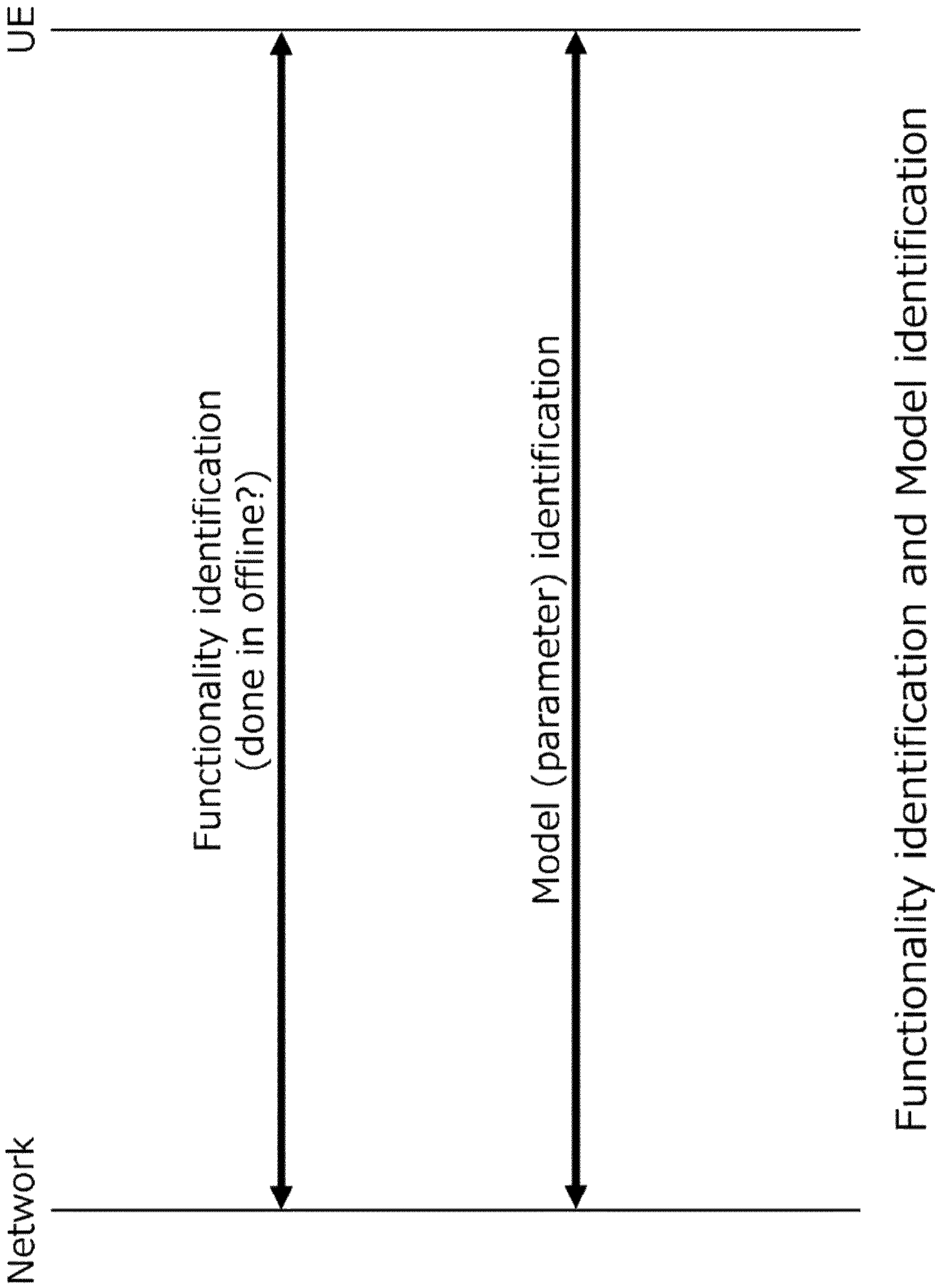
FIG. 12 is a diagram in the proposal document.

See FIG. 12.

Proposal 9

If functionality identification is performed within 3GPP framework, it should be performed before the model identification.

From perspective of the model identification, the problem is how to identify model structure. There are multiple possibility to solve the problem:

- Solution 1: UE driven-identify model structure identically in functionality identification
- Solution 2: NW driven-identify model structure identically in functionality identification
- Solution 3: identify model structure by differentiating model ID with consideration of model structure
- Solution 4: UE indicate deployed model structure to the network, separately.
- Solution 5: Model performance requirements are specified in spec. for each use case. UE selects appropriate model structure that satisfies specified requirements, without awareness from the network.

In solution 1, based on the information about available AI/ML use cases, UE decides model structure to apply. On the other hand, in solution 2, the network decides the model structure to apply based on the report from UE about AI/ML related capability.

There are other ways without involving functionality identification. In solution 3, model structure is identified by indicating model ID, by including model structure ID information to the model ID (hierarchical ID). In solution 4, model structure is identified by any schemes outside the 3GPP specification. In solution 5, only the model performance is specified with applicable model structure. By referring to the specification, applied model structure is identified depending on the use cases.

Proposal 10

Discuss further about preferable solutions to identify model structure with/without functionality identification.

4 Conclusion

In this contribution, we discussed about AI/ML framework and model ID. The following proposals and observations were made.

Proposal 1

Application of proprietary AI/ML model application in case of model z can be precluded.

Proposal 2

Confirm the following working assumption:

- Define Level y-z boundary based on whether model delivery is transparent to 3gpp signalling over the air interface or not.
- Note: other procedures than model transfer/delivery are decoupled with collaboration level y-z
- Clarifying note: Level y includes cases without model delivery.

Proposal 3

Further clarification of the AI/ML collaboration Level y includes:

- Level y-1: NW based AI/ML application
- Level y-2: Dual-sided AI/ML application
- Level y-3: UE based AI/ML application The above clarification can be independently defined as framework, instead of clarification of the collaboration levels.

Observation 1: Model ID is useful for AI/ML model parameter exchange.

Observation 2: Model ID is useful for Model update/upgrade.

Proposal 4

For collaboration level z, controllable model parameters should be aligned with collaboration level y.

Proposal 5

Performance monitoring should be done with awareness of model ID.

Observation 3: Model ID is useful for performance monitoring and model training.

Observation 4: Model ID is useful at least for collaboration level z.

Observation 5: Model ID may be defined as either a set of model parameters or model data.

Proposal 6

Both gNB and UE can indicate model ID depending on the framework deployed.

Observation 6

Exact set of the parameters for a functionality can be defined depending on the use cases.

Proposal 7

Model ID should be able to be indicated separately with functionality ID, in addition to the indication within functionality ID.

Proposal 8

Functionality should be related with the model ID and the collaboration level.

Proposal 9

If functionality identification is performed within 3GPP framework, it should be performed before the model identification.

Proposal 10

Discuss further about preferable solutions to identify model structure with/without functionality identification.e.g., Solution 1: UE driven-identify model structure identically in functionality identification Solution 2: NW driven-identify model structure identically in functionality identification Solution 3: identify model structure by differentiating model ID with consideration of model structure Solution 4: UE indicate deployed model structure to the network, separately.

Solution 5: Model performance requirements are specified in spec. for each use case. UE selects appropriate model structure that satisfies specified requirements, without awareness from the network.

REFERENCES

[1] RP-213599, New SI: Study on Artificial Intelligence (AI)/Machine Learning (ML) for NR Air Interface, 3GPP TSG RAN Meeting #94e, E-meeting, Dec. 6-17, 2021.

[2] TR 37.817, "Study on enhancement for data collection for NR and ENDC", Rel-17, March 2022.

The present disclosure has been described above based on embodiments. It is obvious to those skilled in the art that various variations are possible in combinations of each component or each process disclosed in the exemplary embodiments, and that such variations are also encompassed within the scope of the present disclosure.

It should be noted that the structures, the operations, or the functions of each apparatus or each method described in the embodiments can be realized by hardware resources or software resources, or by cooperation of hardware resources and software resources. Processors, ROMs, RAMs, or various integrated circuits, for example, can be used as hardware resources. Programs such as operating systems and applications, for example, can be used as software resources.

The present disclosure may be referred to as the following items.

1. A communication control apparatus comprising at least one processor that performs:

in case a communication control model concerning communication control between a communication device and a network that provides communication service to the communication device can be managed by the communication device and the network under different management schemes, causing an ID associator to associate a communication-device-side ID of the communication control model managed by the communication device and a network-side ID of the communication control model managed by the network; and causing an identifying information provider to provide identifying information from at least one of the communication device and the network to the other of the communication device and the network to identify the correct communication control model in accordance with the association between the communication-device-side ID and the network-side ID.

2. The communication control apparatus according to item 1, wherein the identifying information provider provides the identifying information from the network to the communication device to identify the communication-device-side ID.

3. The communication control apparatus according to item 1 or 2, wherein the communication-device-side ID and the network-side ID are different from each other, and wherein the identifying information provider provides a second ID used by the other of the communication device and the network, which is associated with a first ID used by the one of the communication device and the network, from the one to the other as the identifying information.

4. The communication control apparatus according to item 1 or 2, wherein the ID associator sets the communication-device-side ID and the network-side ID to the same common ID, and wherein the identifying information provider provides the common ID as the identifying information from the one of the communication device and the network to the other.

5. The communication control apparatus according to item 1 or 2, wherein the ID associator sets a set ID corresponding to the pair of the communication-device-side ID and the network-side ID, and wherein the identifying information provider provides the set ID as the identifying information from the one of the communication device and the network to the other.

6. The communication control apparatus according to item 5, wherein the other of the communication device and the network recognizes an ID in its own management scheme corresponding to the set ID provided from the one of the communication device and the network.

7. The communication control apparatus according to item 1 or 2, wherein the ID associator generates association information of the communication-device-side ID and the network-side ID, and wherein the identifying information provider provides the association information as the identifying information from the one of the communication device and the network to the other.

8. The communication control apparatus according to item 1 or 2, wherein the ID associator provides one of the associated communication-device-side ID and network-side ID by including information on the other of the associated communication-device-side ID and network-side ID, and wherein the identifying information provider provides information on the one of the associated communication-device-side ID and network-side ID as the identifying information from the one of the communication device and the network to the other.

9. The communication control apparatus according to any of items 1 to 8, wherein the at least one processor performs, causing a checker to check whether the communication device and the network manage the communication control model under different management schemes, and wherein the identifying information provider provides the identifying information from at least one of the communication device and the network to the other, in case it has been confirmed that the communication device and the network manage the communication control model under different management schemes.

10. A communication control method performing by at least one processor:

in case a communication control model concerning communication control between a communication device and a network that provides communication service to the communication device can be managed by the communication device and the network under different management schemes, associating a communication-device-side ID of the communication control model managed by the communication device and a network-side ID of the communication control model managed by the network; and providing identifying information from at least one of the communication device and the network to the other of the communication device and the network to identify the correct communication control model in accordance with the association between the communication-device-side ID and the network-side ID.

11. A computer-readable medium storing a communication control program causing at least one processer to perform: in case a communication control model concerning communication control between a communication device and a network that provides communication service to the communication device can be managed by the communication device and the network under different management schemes, associating a communication-device-side ID of the communication control model managed by the communication device and a network-side ID of the communication control model managed by the network; and providing identifying information from at least one of the communication device and the network to the other of the communication device and the network to identify the correct communication control model in accordance with the association between the communication-device-side ID and the network-side ID.

The present application claims priorities of Japanese patent application 2023-22402, filed on Feb. 16, 2023, and Japanese patent application 2023-62135, filed on Apr. 6, 2023, which are hereby incorporated by reference in their entirety.

The present disclosure relates to handling different management schemes for communication control model.

1 wireless communication system, 2 communication device, 3 communication control apparatus, 11 5G wireless communication system, 12 4G wireless communication system, 13 satellite communication system, 31 ID associator, 32 identifying information provider, 33 checker, 111 5G base station, 112 5G cell, 121 4G base station, 122 4G cell, 131 communication satellite, 132 satellite communication cell, 133 gateway, SC1 functionality-based management scheme, SC2 model-based management scheme.

What is claimed is:

1. A communication control apparatus comprising at least one processor that performs:

in response to a communication control model concerning communication control between a communication device and a network that provides communication service to the communication device being manageable by the communication device and the network under different management schemes, causing an ID associator to associate a communication-device-side ID of the communication control model managed by the communication device and a network-side ID of the communication control model managed by the network; and wherein the ID associator sets a set ID corresponding to the pair of the communication-device-side ID and the network-side ID, and wherein the identifying information provider provides the set ID as the identifying information from the one of the communication device and the network to the other;

causing an identifying information provider to provide identifying information from at least one of the communication device and the network to the other of the communication device and the network to identify the correct communication control model in accordance with the association between the communication-device-side ID and the network-side ID.

2. The communication control apparatus according to claim 1, wherein the identifying information provider provides the identifying information from the network to the communication device to identify the communication-device-side ID.

3. The communication control apparatus according to claim 1, wherein the communication-device-side ID and the network-side ID are different from each other, and wherein the identifying information provider provides a second ID used by the other of the communication device and the network, which is associated with a first ID used by the one of the communication device and the network, from the one to the other as the identifying information.

4. The communication control apparatus according to claim 1, wherein the ID associator sets the communication-device-side ID and the network-side ID to an identical common ID, and wherein the identifying information provider provides the identical common ID as the identifying information from the one of the communication device and the network to the other.

5. The communication control apparatus according to claim 1, wherein the other of the communication device and the network recognizes an ID in the management scheme of the network corresponding to the set ID provided from the one of the communication device and the network.

6. The communication control apparatus according to claim 1, wherein the ID associator generates association information of the communication-device-side ID and the network-side ID, and wherein the identifying information provider provides the association information as the identifying information from the one of the communication device and the network to the other.

7. The communication control apparatus according to claim 1, wherein the ID associator provides one of the associated communication-device-side ID and network-side ID by including information on the other of the associated communication-device-side ID and network-side ID, and wherein the identifying information provider provides information on the one of the associated communication-device-side ID and network-side ID as the identifying information from the one of the communication device and the network to the other.

8. The communication control apparatus according to claim 1, wherein the at least one processor performs, causing a checker to check whether the communication device and the network manage the communication control model under different management schemes, and wherein the identifying information provider provides the identifying information from at least one of the communication device and the network to the other, in case it has been confirmed that the communication device and the network manage the communication control model under different management schemes.

9. A communication control method performing by at least one processor:

in response to a communication control model concerning communication control between a communication device and a network that provides communication service to the communication device being manageable by the communication device and the network under different management schemes, associating a communication-device-side ID of the communication control model managed by the communication device and a network-side ID of the communication control model managed by the network; and setting a set ID corresponding to the pair of the communication-device-side ID and the network-side ID, and providing the set ID as the identifying information from the one of the communication device and the network to the other;

providing identifying information from at least one of the communication device and the network to the other of the communication device and the network to identify the correct communication control model in accordance with the association between the communication-device-side ID and the network-side ID.

10. A non-transitory computer-readable medium storing a communication control program causing at least one processor to perform:

in response to a communication control model concerning communication control between a communication device and a network that provides communication service to the communication device being manageable by the communication device and the network under different management schemes, associating a communication-device-side ID of the communication control model managed by the communication device and a network-side ID of the communication control model managed by the network; and setting a set ID corresponding to the pair of the communication-device-side ID and the network-side ID, and providing the set ID as the identifying information from the one of the communication device and the network to the other;

providing identifying information from at least one of the communication device and the network to the other of the communication device and the network to identify the correct communication control model in accordance with the association between the communication-device-side ID and the network-side ID.

* * * * *